US008510776B2

(12) United States Patent
Fukuda et al.

(10) Patent No.: US 8,510,776 B2
(45) Date of Patent: Aug. 13, 2013

(54) INFORMATION PROVIDING SYSTEM, INFORMATION RECEIVING TERMINAL, INFORMATION PROVIDING APPARATUS, INFORMATION PROVIDING METHOD AND PROGRAM

(75) Inventors: Kazuhiro Fukuda, Kanagawa (JP); Tetsuo Maruyama, Tokyo (JP); Asako Honjo, Tokyo (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 12/131,393

(22) Filed: Jun. 2, 2008

(65) Prior Publication Data

US 2009/0031353 A1    Jan. 29, 2009

(30) Foreign Application Priority Data

Jul. 26, 2007  (JP) ................. 2007-194837

(51) Int. Cl.
*G06F 3/00* (2006.01)
*G06F 13/00* (2006.01)
(52) U.S. Cl.
USPC ............. 725/40; 725/39; 725/52; 725/61
(58) Field of Classification Search
USPC ................. 725/37, 39, 45, 50–53, 58, 61
See application file for complete search history.

(56) References Cited

U.S. PATENT DOCUMENTS

| 6,025,837 | A  | * | 2/2000 | Matthews et al. ............... | 725/51 |
| 6,240,555 | B1 | * | 5/2001 | Shoff et al. .................... | 725/51 |
| 6,268,849 | B1 |   | 7/2001 | Boyer et al. |   |
| 6,751,401 | B1 | * | 6/2004 | Arai et al. ..................... | 725/52 |
| 7,178,158 | B2 | * | 2/2007 | Nishina et al. ................. | 725/39 |
| 2002/0178446 | A1 |   | 11/2002 | Sie et al. |   |
| 2003/0149988 | A1 | * | 8/2003 | Ellis et al. ..................... | 725/39 |
| 2003/0208763 | A1 |   | 11/2003 | McElhatten et al. |   |
| 2004/0117831 | A1 | * | 6/2004 | Ellis et al. ..................... | 725/53 |
| 2005/0028208 | A1 | * | 2/2005 | Ellis et al. ..................... | 725/58 |
| 2006/0031883 | A1 | * | 2/2006 | Ellis et al. ..................... | 725/58 |
| 2007/0154163 | A1 | * | 7/2007 | Cordray ........................ | 386/52 |
| 2007/0157260 | A1 |   | 7/2007 | Walker |   |
| 2008/0010655 | A1 | * | 1/2008 | Ellis et al. ..................... | 725/38 |
| 2010/0211975 | A1 | * | 8/2010 | Boyer et al. ................... | 725/40 |

FOREIGN PATENT DOCUMENTS

| JP | 07-321748   | 12/1995 |
| JP | 2001-292424 | 10/2001 |
| JP | 2002-142208 | 5/2002  |
| JP | 2003-203035 | 7/2003  |
| JP | 2004-193681 | 7/2004  |

(Continued)

*Primary Examiner* — Hai V Tran
(74) *Attorney, Agent, or Firm* — Oblon, Spivak, McClelland, Maier & Neustadt, L.L.P.

(57) ABSTRACT

An information receiving terminal includes a designation information transmitting portion to transmit designation information designating a program and a related information receiving portion. The information providing apparatus includes a related information storage portion to store related information containing a plurality of information to which each provision period is settable in association with a program, a designation information receiving portion, a related information extracting portion to extract the related information appropriate for a designated program, and a related information transmitting portion to transmit the extracted related information. The information receiving terminal or the information providing apparatus includes an information selecting portion to select information to which a provision period corresponding to a provision time point of the related information is set from a plurality of information constituting the received/extracted related information as information constituting the related information. An information providing system effectively providing program-related information is provided.

15 Claims, 18 Drawing Sheets

(56) References Cited

FOREIGN PATENT DOCUMENTS

| | | |
|---|---|---|
| JP | 2005-154157 | 6/2005 |
| JP | 2006-5700 | 1/2006 |
| JP | 2006-166284 | 6/2006 |
| JP | 2006-526426 | 11/2006 |
| JP | 2007-60496 | 3/2007 |
| JP | 2007-116719 | 5/2007 |
| JP | 2007-181249 | 7/2007 |
| WO | WO 02/32139 A2 | 4/2002 |
| WO | WO 2005/076616 A1 | 8/2005 |

* cited by examiner

FIG.5
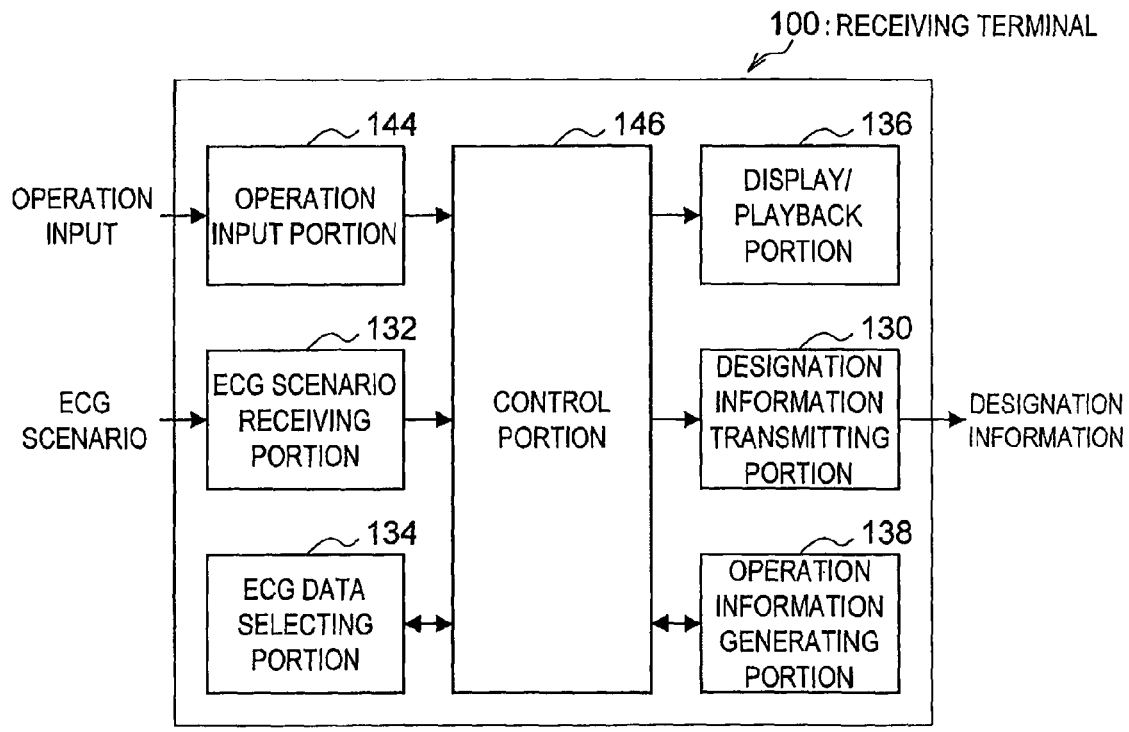
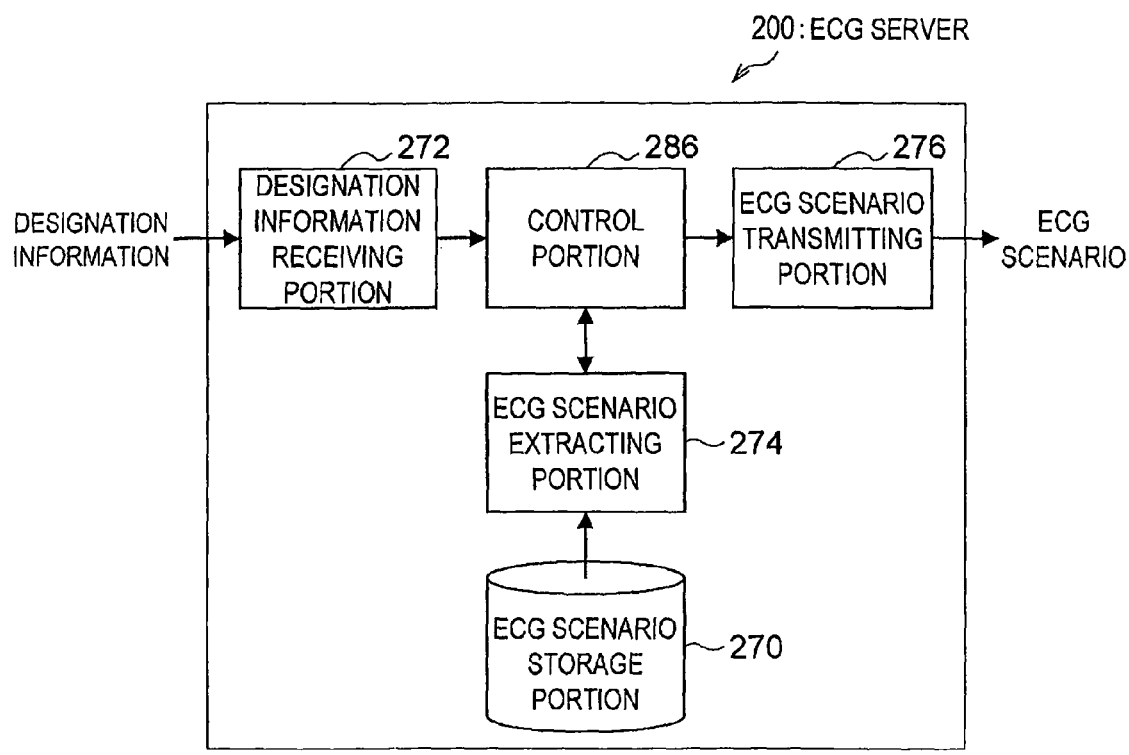

FIG.6
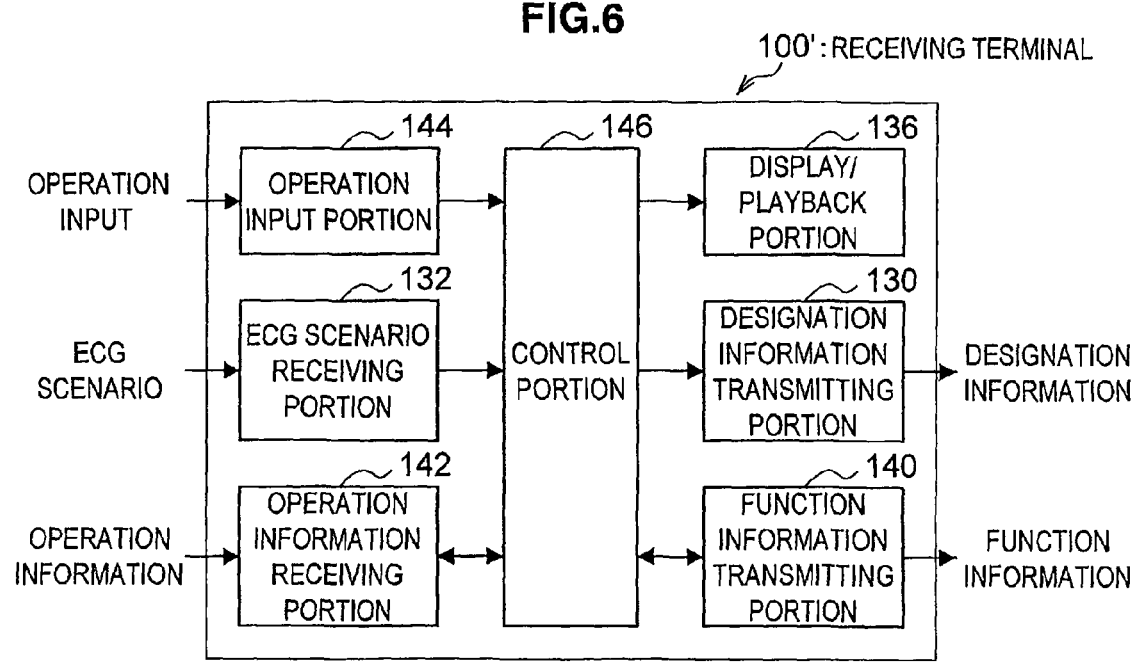
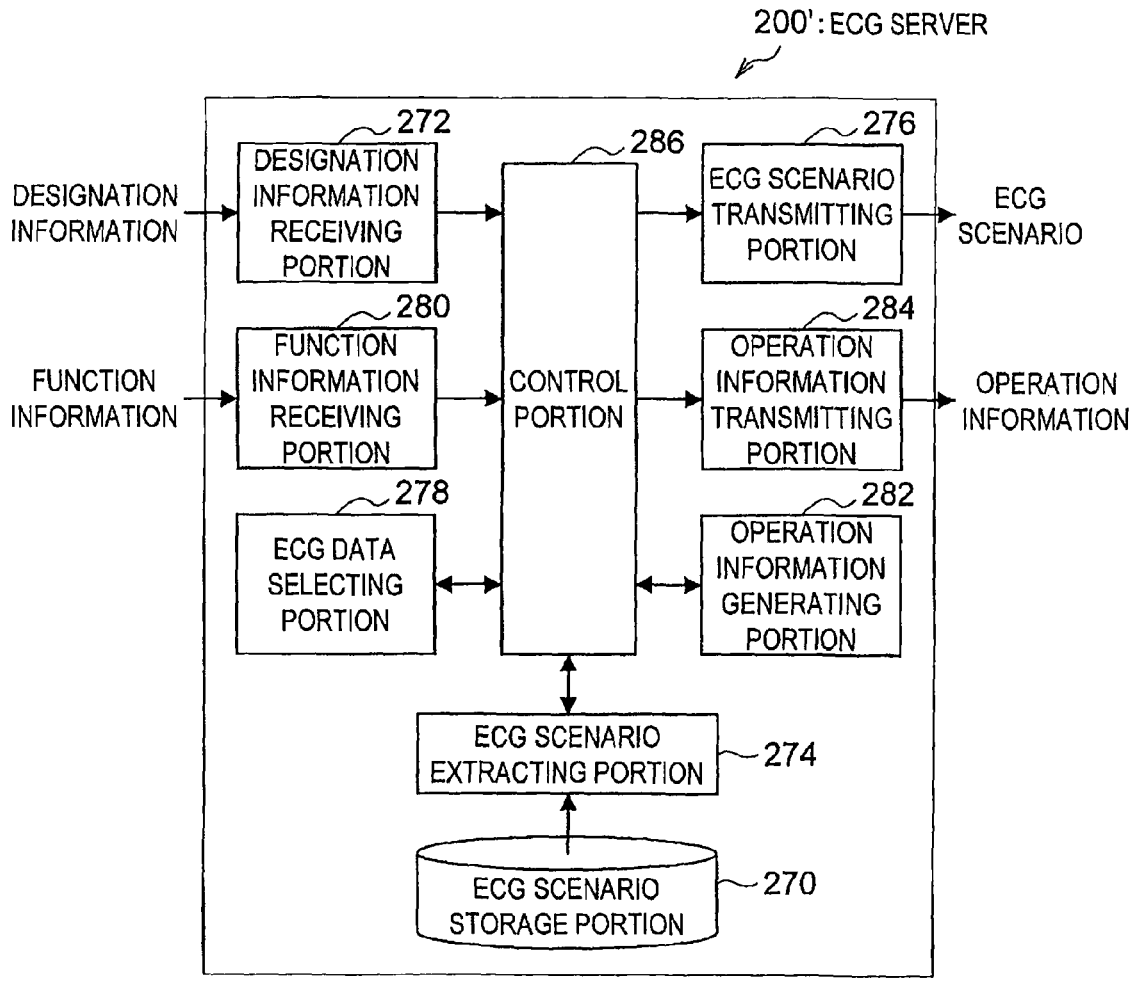

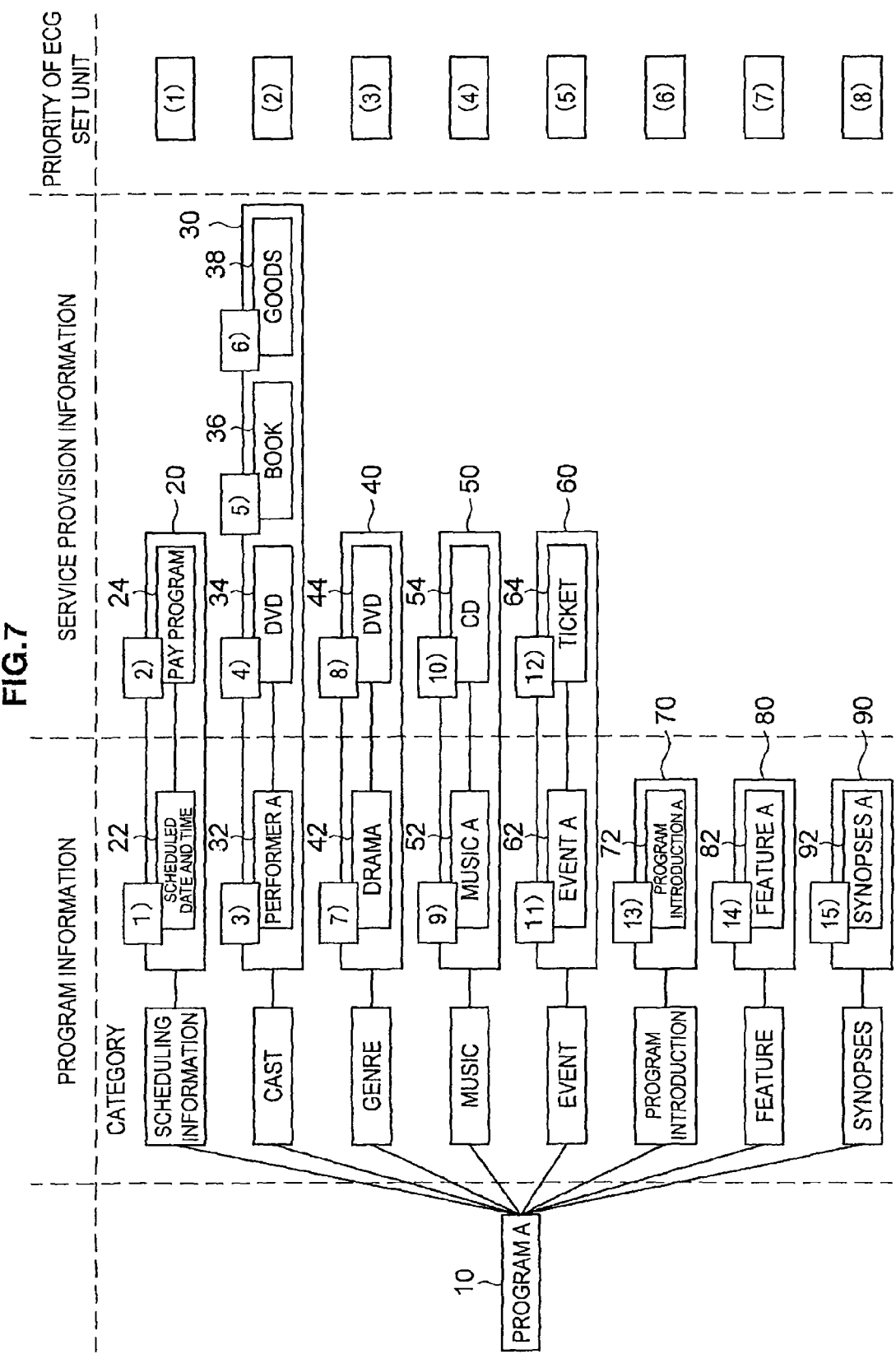

FIG.8A

```
<program id="P00001" name="PROFESSIONAL STYLE" genre="DOCUMENTARY" keywords="AAA AAA  BBB BBB  KNOW-HOW  IMPRESSION">
  <oa start_date="2007/7/10" start_time="22:00:00" end_date="2007/7/10" end_time="23:00:00">
    <details>
      <CreditsList>
        <Person id="1_1" name="AAA AAA" Birthplace="Japan" />
        <Person id="1_2" name="BBB BBB" Birthplace="Japan" />
        <Person id="1_3" name="CCC CCC" Birthplace="Japan" />
      </CreditsList>
    </details>
  </oa>
  <relation id="AA1" reference_id_list="L00001" />
</program>
```

FIG.8B

```
<content id="C00001" name="PRODUCT 1" genre="PUBLICATION" keywords="XXX YYY ZZZ" maker="zony" price="100 YEN" content_info=" www.zony.co.jp " />
```

FIG.8C

```
<program_relation id="L00001" name="HHH" start_date="2007/7/10" start_time="22:00:00" end_date="2007/7/10" end_time="23:00:00" >
  <link_program id="1" program_id="P00001" genre="SHOPPING " />
  <link_content id="1" content_id="C00001" genre="SPORT" />
  <link_content id="2" content_id="C00002" genre="DVD" />
  <link_content id="3" content_id="C00003" genre="PUBLICATION" />
</program_relation>
```

FIG.9A

```
<ecg_scenario id="sc00011" name="ECG SCENARIO" start_date="2007/7/1" start_time="00:00:00" end_date="2007/7/20" end_time="00:00:00" memo="BROADCAST TIME 2007/7/10 FROM 10 PM TO 11PM" >
    <ecg_set_content id="ecg_set_c1" ecg_set_id="es00001" />
    <ecg_set_content id="ecg_set_c2" ecg_set_id="es00002" />
</ecg_scenario>
```

FIG.9B

```
<ecg_set id="es00001" name="ECG SET 1" start_date="2007/7/1" start_time="00:00:00" end_date="2007/7/20" end_time="00:00:00" >
    <content id="c11" type="program" program_id="P011" start_date="2007/7/10" start_time="22:00:00" end_date="2007/7/10" end_time="23:00:00" />
    <content id="c12" type="program" program_id="P012" start_date="2007/7/10" start_time="22:00:00" end_date="2007/7/10" end_time="23:00:00" />
    <content id="c13" type="program" program_id="P013" start_date="2007/7/1" start_time="00:00:00" end_date="2007/7/20" end_time="00:00:00" />
    <content id="c14" type="product" content_id="C011" start_date="2007/7/1" start_time="00:00:00" end_date="2007/7/20" end_time="00:00:00" />
</ecg_set>
```

FIG.9C

```
<ecg_set id="es00002" name="ECG SET 2" start_date="2007/7/1" start_time="00:00:00" end_date="2007/7/20" end_time="00:00:00" >
    <content id="c21" type="program" program_id="P021" start_date="2007/7/10" start_time="22:00:00" end_date="2007/7/10" end_time="23:00:00" />
    <content id="c22" type="program" program_id="P022" start_date="2007/7/10" start_time="23:00:00" end_date="2007/7/10" end_time="23:00:00" />
    <content id="c23" type="product" content_id="C021" start_date="2007/7/1" start_time="00:00:00" end_date="2007/7/20" end_time="00:00:00" />
</ecg_set>
```

FIG.18
■ PROGRAM INFORMATION OF SUBSEQUENT PROGRAM
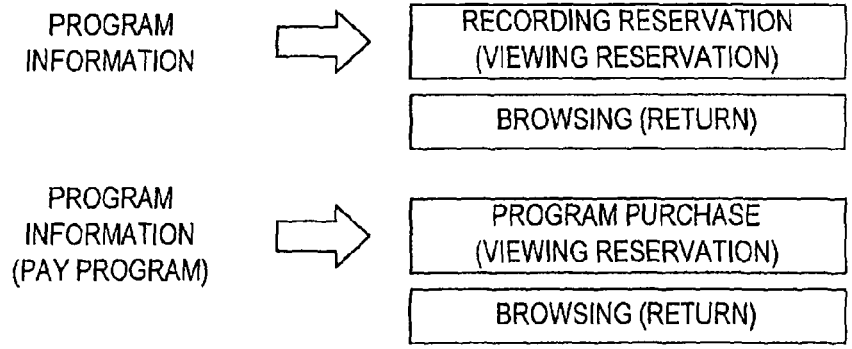
■ PROGRAM INFORMATION OF CURRENT PROGRAM
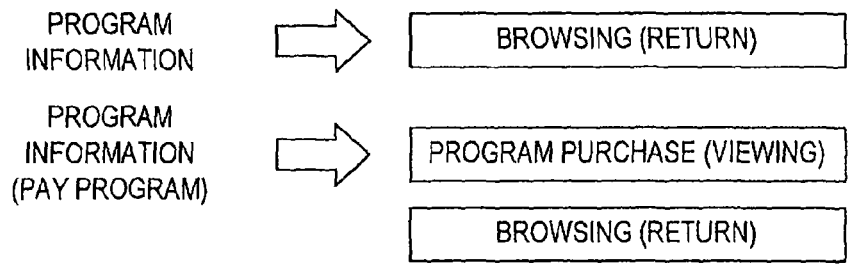
■ PROGRAM INFORMATION OF PREVIOUS PROGRAM
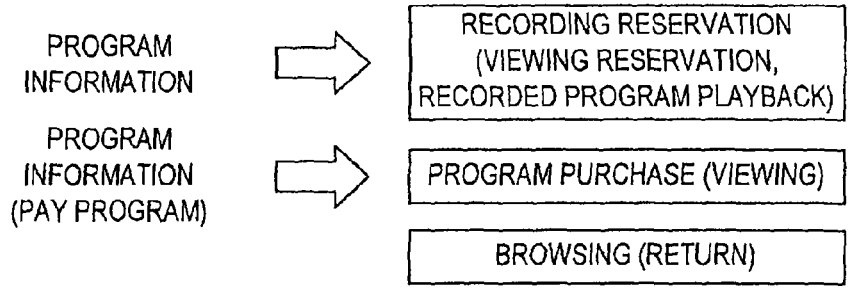
■ SERVICE PROVISION INFORMATION
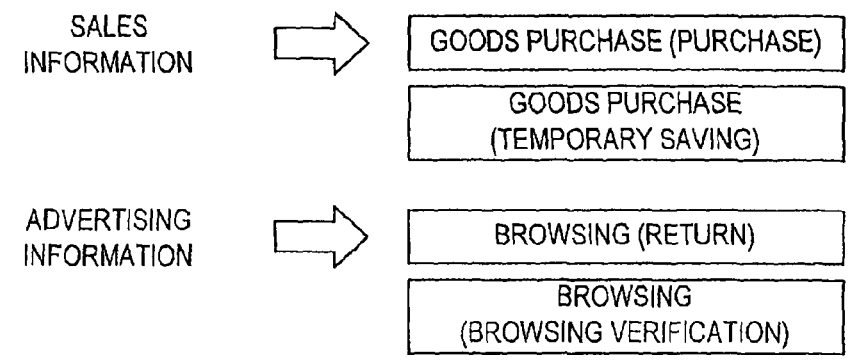

INFORMATION PROVIDING SYSTEM, INFORMATION RECEIVING TERMINAL, INFORMATION PROVIDING APPARATUS, INFORMATION PROVIDING METHOD AND PROGRAM

CROSS REFERENCES TO RELATED APPLICATIONS

The present invention contains subject matter related to Japanese Patent Application JP 2007-194837 filed in the Japan Patent Office on Jul. 26, 2007, the entire contents of which being incorporated herein by reference.

BACKGROUND OF THE INVENTION

1. Field of the Invention

The present invention relates to an information providing system, an information receiving terminal, an information providing apparatus, an information providing method and program.

2. Description of the Related Art

Recently, a system in which content (program) providers transmit video/audio information concerning a program, and a user receives, displays and plays back the video/audio information using an information receiving terminal and views the video/audio information has been widespread. In such an information providing system, information related to a program is transmitted together with the video/audio information. A user thereby receives related information in addition to video/audio information of a program, so that the user can browse the related information while viewing the program.

Japanese Patent Application Publication No. 7-321748 discloses a Video-On-Demand (VOD) system which allows browsing of detail information concerning the object that is displayed on the screen of the program currently on air (e.g. a product, ornament, clothes, shoes, furniture and house of a program providing/sponsoring maker etc.). In the VOD system, video information of a program and detail information concerning the program (which is an example of related information) are accumulated in a VOD provider, and the video information and the related information are distributed to a VOD receiver in response to a request from a user.

SUMMARY OF THE INVENTION

In an information providing system of a related art, however, related information of a program which is scheduled for a time period that is not currently viewable is not provided to a user while viewing a time-scheduled program. Further, in an information providing system of a related art such as the above-described VOD system, for example, related information which is transmitted together with video information of a program is provided as fixed information that is associated with the program. Furthermore, in an information providing system of a related art, operation information which is provided to a user for operation regarding related information can differ from provider to provider that provides each related information.

Therefore, a user cannot browse the related information of a program which is scheduled for a time period that is not currently viewable. Further, because the related information is provided as fixed information, a user cannot browse timely appropriate related information, such as information that introduces a program, according to the temporal relationship between the scheduled date and time (provision date and time) of a program and the provision date and time of related information. Furthermore, if operation information regarding related information differs from provider to provider, a user cannot perform operation regarding related information efficiently because complicated operation is required.

On the other hand, a content provider cannot provide the related information of a program which is scheduled for a time period that is not currently viewable. Further, because the related information is provided as fixed information, a content provider cannot provide timely appropriate related information, such as information that introduces a program, according to the temporal relationship between the provision date and time of a program and the provision date and time of related information. Furthermore, if operation information regarding related information differs from provider to provider, a content provider cannot prompt a user to perform operation regarding related information efficiently.

In light of the foregoing, it is desirable to provide an information providing system, an information receiving terminal, an information providing apparatus, an information providing method and program which are capable of providing program-related information efficiently.

According to a first embodiment of the present invention, there is provided an information providing system where an information receiving terminal for receiving a program and an information providing apparatus for providing related information associated with a program are connected through a communication network. In the information providing system, the information receiving terminal includes a designation information transmitting portion to transmit designation information designating a program to the information providing apparatus, and a related information receiving portion to receive the related information appropriate for a designated program from the information providing apparatus. The information providing apparatus includes a related information storage portion to store the related information composed of a plurality of pieces of information to which each provision period is settable in association with a program, a designation information receiving portion to receive the designation information from the information receiving terminal, a related information extracting portion to extract the related information appropriate for a designated program from the related information storage portion, and a related information transmitting portion to transmit the extracted related information to the information receiving terminal. At least one of the information receiving terminal and the information providing apparatus includes an information selecting portion to select information to which a provision period corresponding to a provision time point of the related information is set from a plurality of pieces of information constituting the related information received by the information receiving terminal or the related information extracted by the information providing apparatus as information constituting the related information.

In this configuration, the information providing apparatus stores the related information which is composed of a plurality of pieces of information to which each provision period is settable in association with a program. The information receiving terminal transmits designation information designating a program to the information providing apparatus, and the information providing apparatus receives the designation information and extracts the related information which is appropriate for a designated program from the related information storage portion. The information providing apparatus transmits the extracted related information to the information receiving terminal, and the information receiving terminal receives the transmitted related information. Further, the information receiving terminal or the information providing apparatus selects information to which a provision period corresponding to a provision time point of the related information is set from a plurality of pieces of information constituting the related information which is received by the information receiving terminal or the related information which is extracted by the information providing apparatus as information constituting the related information. Because the information to which the provision period corresponding to the provision time point of the related information is set is thereby selected, it is possible to provide timely appropriate related information.

According to a second embodiment of the present invention, there is provided an information receiving terminal for receiving a program, which is connected with an information providing apparatus for providing related information associated with a program through a communication network. The information receiving terminal includes a designation information transmitting portion to transmit designation information designating a program to the information providing apparatus, a related information receiving portion to receive the related information extracted to be appropriate for a designated program from related information composed of a plurality of pieces of information to which each provision period is settable and stored in association with a program from the information providing apparatus, and an information selecting portion to select information to which a provision period corresponding to a provision time point of the related information is set from a plurality of pieces of information constituting the received related information as information constituting the related information.

In this configuration, the information receiving terminal transmits designation information designating a program to the information providing apparatus. The information receiving terminal receives the related information which is extracted to be appropriate for a designated program from related information that is composed of a plurality of pieces of information to which each provision period is settable and stored in association with a program from the information providing apparatus. Then, the information receiving terminal selects information to which a provision period corresponding to a provision time point of the related information is set from a plurality of pieces of information constituting the received related information as information constituting the related information. Because the information to which the provision period corresponding to the provision time point of the related information is set is thereby selected, a user can browse timely appropriate related information.

In the above information receiving terminal, a program may be scheduled with time, and the related information may contain information in which each provision period is set to a period of a program scheduled time and a period at least before or after a program scheduled time. In this configuration, in the information which is contained in the related information, each provision period is set to a period of a program scheduled time and a period at least before or after a program scheduled time. A user can thereby browse timely appropriate related information according to a temporal relationship between a scheduled time of a program and a provision time point of the related information.

The above information receiving terminal may further include a display/playback portion to display/playback the received related information, and the related information may be composed of one or more scenario information in a scenario form so as to sequentially display/playback a plurality of pieces of information. Because the related information is composed of one or more scenario information in a scenario form so as to sequentially display/playback a plurality of pieces of information in this configuration, a user can efficiently browse information which is associated with a program.

According to a third embodiment of the present invention, there is provided an information providing apparatus for providing related information associated with a program, which is connected with an information receiving terminal for receiving a program through a communication network. The information providing apparatus includes a related information storage portion to store the related information composed of a plurality of pieces of information to which each provision period is settable in association with a program, a designation information receiving portion to receive designation information designating a program from the information receiving terminal, a related information extracting portion to extract the related information appropriate for a designated program from the related information storage portion, an information selecting portion to select information to which a provision period corresponding to a provision time point of the related information is set from a plurality of pieces of information constituting the extracted related information as information constituting the related information, and a related information transmitting portion to transmit the related information composed of selected information to the information receiving terminal.

In this configuration, the information providing apparatus stores the related information which is composed of a plurality of pieces of information to which each provision period is settable in association with a program. The information providing apparatus receives designation information designating a program from the information receiving terminal and extracts the related information which is appropriate for a program that is designated by the designation information from the related information storage portion. The information providing apparatus selects information to which a provision period corresponding to a provision time point of the related information is set from a plurality of pieces of information constituting the extracted related information as information constituting the related information and transmits the related information which is composed of selected information to the information receiving terminal. Because the information to which the provision period corresponding to the provision time point of the related information is set is thereby selected, a content provider can provide timely appropriate related information.

In the above information providing apparatus, a program may be scheduled with time, and the related information may contain information in which each provision period is set to a period of a program scheduled time and a period at least before or after a program scheduled time. In this configuration, in the information which is contained in the related information, each provision period is set to a period of a program scheduled time and a period at least before or after a program scheduled time. A content provider can thereby provide timely appropriate related information according to a temporal relationship between a scheduled time of a program and a provision time point of the related information.

Further, the related information may be composed of one or more scenario information in a scenario form so as to sequentially display/playback a plurality of pieces of information by the information receiving terminal. Because the related information is composed of one or more scenario information in a scenario form so as to sequentially display/playback a plurality of pieces of information in this configuration, a content provider can effectively prompt a user to browse information which is associated with a program.

According to a fourth embodiment of the present invention, there is provided an information providing method which is applied to an information providing system where an information receiving terminal for receiving a program and an information providing apparatus for providing related information associated with a program are connected through a communication network. The information providing method includes the steps of storing the related information composed of a plurality of pieces of information to which each provision period is settable in association with a program in the information providing apparatus, extracting the related information appropriate for a program designated by the information receiving terminal in the information providing apparatus, transmitting the extracted related information to the information receiving terminal from the information providing apparatus, and selecting information to which a provision period corresponding to a provision time point of the related information is set from a plurality of pieces of information constituting the related information received by the information receiving terminal or the related information extracted by the information providing apparatus as information constituting the related information in the information receiving terminal or the information providing apparatus.

In this method, the related information which is composed of a plurality of pieces of information to which each provision period is settable is stored in association with a program in the information providing apparatus. The related information which is appropriate for a program that is designated by the information receiving terminal is extracted, and the extracted related information is transmitted to the information receiving terminal. Then, in the information receiving terminal or the information providing apparatus, information to which a provision period corresponding to a provision time point of the related information is set is selected from a plurality of pieces of information constituting the related information received by the information receiving terminal or the related information extracted by the information providing apparatus as information constituting the related information. Because the information to which the provision period corresponding to the provision time point of the related information is set is thereby selected, it is possible to provide timely appropriate related information.

According to a fifth embodiment of the present invention, there is provided a program which causes a computer to function as the information receiving terminal according to the second embodiment of the present invention.

According to a sixth embodiment of the present invention, there is provided a program which causes a computer to function as the information providing apparatus according to the third embodiment of the present invention.

According to a seventh embodiment of the present invention, there is provided an information providing system where an information receiving terminal for receiving a program and an information providing apparatus for providing related information associated with a program are connected through a communication network. In the information providing system, the information receiving terminal includes a designation information transmitting portion to transmit designation information designating a program to the information providing apparatus, and a related information receiving portion to receive the related information appropriate for a designated program from the information providing apparatus. The information providing apparatus includes a related information storage portion to store the related information composed of a plurality of pieces of information to which each provision period is settable in association with a program, a designation information receiving portion to receive the designation information from the information receiving terminal, a related information extracting portion to extract the related information appropriate for a designated program from the related information storage portion, and a related information transmitting portion to transmit the extracted related information to the information receiving terminal. Further, at least one of the information receiving terminal and the information providing apparatus includes an information selecting portion to select information to which a provision period corresponding to a provision time point of the related information is set from a plurality of pieces of information constituting the related information received by the information receiving terminal or the related information extracted by the information providing apparatus as information constituting the related information, and an operation information generating portion to generate operation information appropriate for function information specifying a function of the information receiving terminal and a temporal relationship between a scheduled time of a program and a provision time point of the related information for operation regarding the related information.

In this configuration, the information receiving terminal or the information providing apparatus generates operation information which is appropriate for function information specifying a function of the information receiving terminal and a temporal relationship between a scheduled time of a program and a provision time point of the related information for operation regarding the related information. Because the operation information which is appropriate for a function of the information receiving terminal and a temporal relationship between a scheduled time of a program and a provision time point of the related information is generated in a fixed format, it is possible to provide timely appropriate operation information which corresponds to the function of the information receiving terminal.

According to an eighth embodiment of the present invention, there is provided an information receiving terminal for receiving a program, which is connected with an information providing apparatus for providing related information associated with a program through a communication network. The information receiving terminal includes a designation information transmitting portion to transmit designation information designating a program to the information providing apparatus, a related information receiving portion to receive the related information extracted to be appropriate for a designated program from the related information composed of a plurality of pieces of information to which each provision period is settable and stored in association with a program from the information providing apparatus, an information selecting portion to select information to which a provision period corresponding to a provision time point of the related information is set from a plurality of pieces of information constituting the received related information as information constituting the related information, and an operation information generating portion to generate operation information appropriate for function information specifying its own function and a temporal relationship between a scheduled time of a program and a provision time point of the related information for operation regarding the related information.

In this configuration, the information receiving terminal generates operation information which is appropriate for function information specifying its own function and a temporal relationship between a scheduled time of a program and a provision time point of the related information for operation regarding the related information. Because the operation information which is appropriate for a function of the information receiving terminal and a temporal relationship between a scheduled time of a program and a provision time point of the related information is generated in a fixed format, a user can perform operation regarding the related information efficiently without the need for performing complicated operation.

In the above information receiving terminal, a program may be scheduled with time, and the related information may contain information in which each provision period is set to a period of a program scheduled time and a period at least before or after a program scheduled time. In this configuration, in the information which is contained in the related information, each provision period is set to a period of a program scheduled time and a period at least before or after a program scheduled time. A user can thereby perform operation regarding the related information efficiently based on appropriate operation information according to the function of the information receiving terminal and the temporal relationship between a scheduled time of a program and a provision time point of the related information.

According to a ninth embodiment of the present invention, there is provided an information providing apparatus for providing related information associated with a program, which is connected with an information receiving terminal for receiving a program through a communication network. The information providing apparatus includes a related information storage portion to store the related information composed of a plurality of pieces of information to which each provision period is settable in association with a program, a designation information receiving portion to receive designation information designating a program from the information receiving terminal, a related information extracting portion to extract the related information appropriate for a designated program from the related information storage portion, an information selecting portion to select information to which a provision period corresponding to a provision time point of the related information is set from a plurality of pieces of information constituting the extracted related information as information constituting the related information, a related information transmitting portion to transmit the related information composed of selected information to the information receiving terminal, a function information receiving portion to receive function information specifying a function of the information receiving terminal from the information receiving terminal, an operation information generating portion to generate operation information appropriate for the received function information and a temporal relationship between a scheduled time of a program and a provision time point of the related information for operation regarding the related information, and an operation information transmitting portion to transmit the generated operation information to the information receiving terminal.

In this configuration, the information providing apparatus receives function information specifying a function of the information receiving terminal from the information receiving terminal. Then, the information providing apparatus generates operation information which is appropriate for the received function information and a temporal relationship between a provision time of a program and a provision time point of the related information for operation regarding the related information, and transmits the generated operation information to the information receiving terminal. Because the operation information which is appropriate for a function of the information receiving terminal and a temporal relationship between a scheduled time of a program and a provision time point of the related information is generated in a fixed format, a content provider can prompt a user to perform operation regarding the related information efficiently.

In the above information providing apparatus, a program may be scheduled with time, and the related information may contain information in which each provision period is set to a period of a program scheduled time and a period at least before or after a program scheduled time. In this configuration, in the information which is contained in the related information, each provision period is set to a period of a program scheduled time and a period at least before or after a program scheduled time. A content provider can thereby provide appropriate operation information to a user according to the function of the information receiving terminal and the temporal relationship between a scheduled time of a program and a provision time point of the related information.

According to a tenth embodiment of the present invention, there is provided an information providing method which is applied to an information providing system where an information receiving terminal for receiving a program and an information providing apparatus for providing related information associated with a program are connected through a communication network. The information providing method includes the steps of storing the related information composed of a plurality of pieces of information to which each provision period is settable in association with a program in the information providing apparatus, extracting the related information appropriate for a program designated by the information receiving terminal in the information providing apparatus, transmitting the extracted related information to the information receiving terminal from the information providing apparatus, selecting information to which a provision period corresponding to a provision time point of the related information is set from a plurality of pieces of information constituting the related information received by the information receiving terminal or the related information extracted by the information providing apparatus as information constituting the related information in the information receiving terminal or the information providing apparatus, and generating operation information appropriate for function information specifying a function of the information receiving terminal and a temporal relationship between a scheduled time of a program and a provision time point of the related information for operation regarding the related information in the information receiving terminal or the information providing apparatus.

In this method, in the information receiving terminal or the information providing apparatus, operation information which is appropriate for function information specifying a function of the information receiving terminal and a temporal relationship between a scheduled time of a program and a provision time point of the related information are generated for operation regarding the related information. Because the operation information which is appropriate for a function of the information receiving terminal and a temporal relationship between a scheduled time of a program and a provision time point of the related information is generated in a fixed format, it is possible to provide timely appropriate operation information which corresponds to the function of the information receiving terminal.

According to an eleventh embodiment of the present invention, there is provided a program which causes a computer to function as the information receiving terminal according to the eighth embodiment of the present invention.

According to a twelfth embodiment of the present invention, there is provided a program which causes a computer to function as the information providing apparatus according to the ninth embodiment of the present invention.

According to the embodiments of the present invention described above, it is possible to provide an information providing system, an information receiving terminal, an information providing apparatus, an information providing method and program which are capable of providing related information of a program efficiently.

BRIEF DESCRIPTION OF THE DRAWINGS

FIG. 5 is a block diagram showing main elements of a receiving terminal and an ECG server.

FIG. 6 is a block diagram showing main elements of a receiving terminal and an ECG server according to an alternative example.

FIG. 7 is an explanatory view showing an example of the structure of ECG data which is contained in an ECG scenario.

FIG. 8A is an explanatory view showing an example of metadata (for program information) which constitutes an ECG scenario.

FIG. 8B is an explanatory view showing an example of metadata (for service provision information) which constitutes an ECG scenario.

FIG. 8C is an explanatory view showing an example of metadata (for association information) which constitutes an ECG scenario.

FIG. 9A is an explanatory view showing an example of metadata (for ECG scenario) which constitutes an ECG scenario.

FIG. 9B is an explanatory view showing an example of metadata (for ECG set) which constitutes an ECG scenario.

FIG. 9C is an explanatory view showing an example of metadata (for ECG set) which constitutes an ECG scenario.

FIG. 18 is an explanatory view showing an example of the display of operation information.

DETAILED DESCRIPTION OF THE PREFERRED EMBODIMENTS

Figure 1:
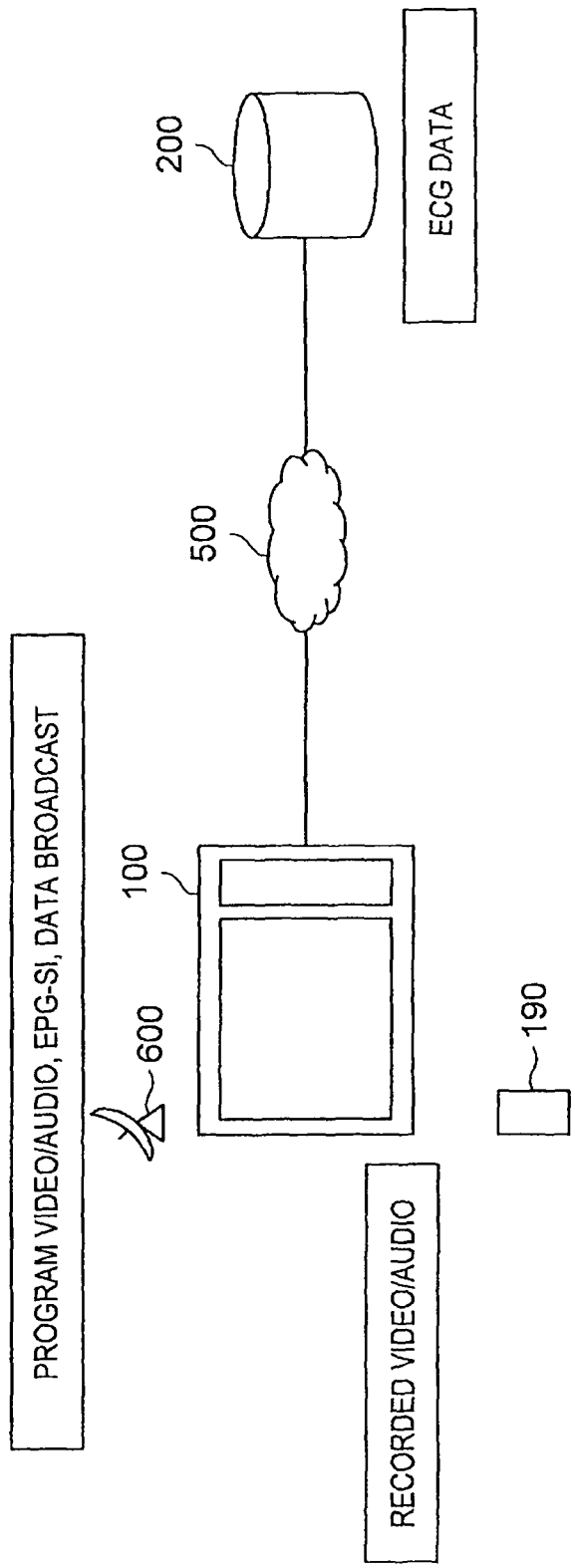
FIG. 1 is an explanatory view conceptually showing the overall configuration of an information providing system according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Overall Configuration of Information Providing System)

FIG. 1 is an explanatory view conceptually showing the overall configuration of an information providing system according to an embodiment of the present invention. Referring to FIG. 1, the information providing system includes a receiving terminal 100 (information receiving terminal) of a user and an electronic content guide (ECG) server 200 (information providing apparatus).

The receiving terminal 100 receives video/audio information, data broadcast information and electronic program guide-service information (EPG-SI) which are related to a program through a receiving antenna 600 or the like and provides the information to a user. In some cases, the receiving terminal 100 provides prerecorded video/audio information to a user. Further, the receiving terminal 100 according to this embodiment can receive the information related to a program from the ECG server 200 which is connected through a communication network 500 and provide the received information to a user. The ECG server 200 registers and manages the information which is related to a program as ECG data and provides the registered and managed ECG data to the receiving terminal 100 through the communication network 500.

A user of the receiving terminal 100 can select the information which is viewable or browsable (receivable), such as video/audio information, data broadcast information, EPG-SI information and ECG data that are related to a program, by operating a remote control 190 for the receiving terminal 100, for example. On a display screen of the receiving terminal 100, video information and ECG data which are related to a program are respectively displayed on the left and right sides of the display screen, for example, in the state where the ECG service provision is active. In the following description, the expression "display of a program, ECG data and related information (ECG scenario)" includes the meaning "playback of a program and related information".

Figure 2:
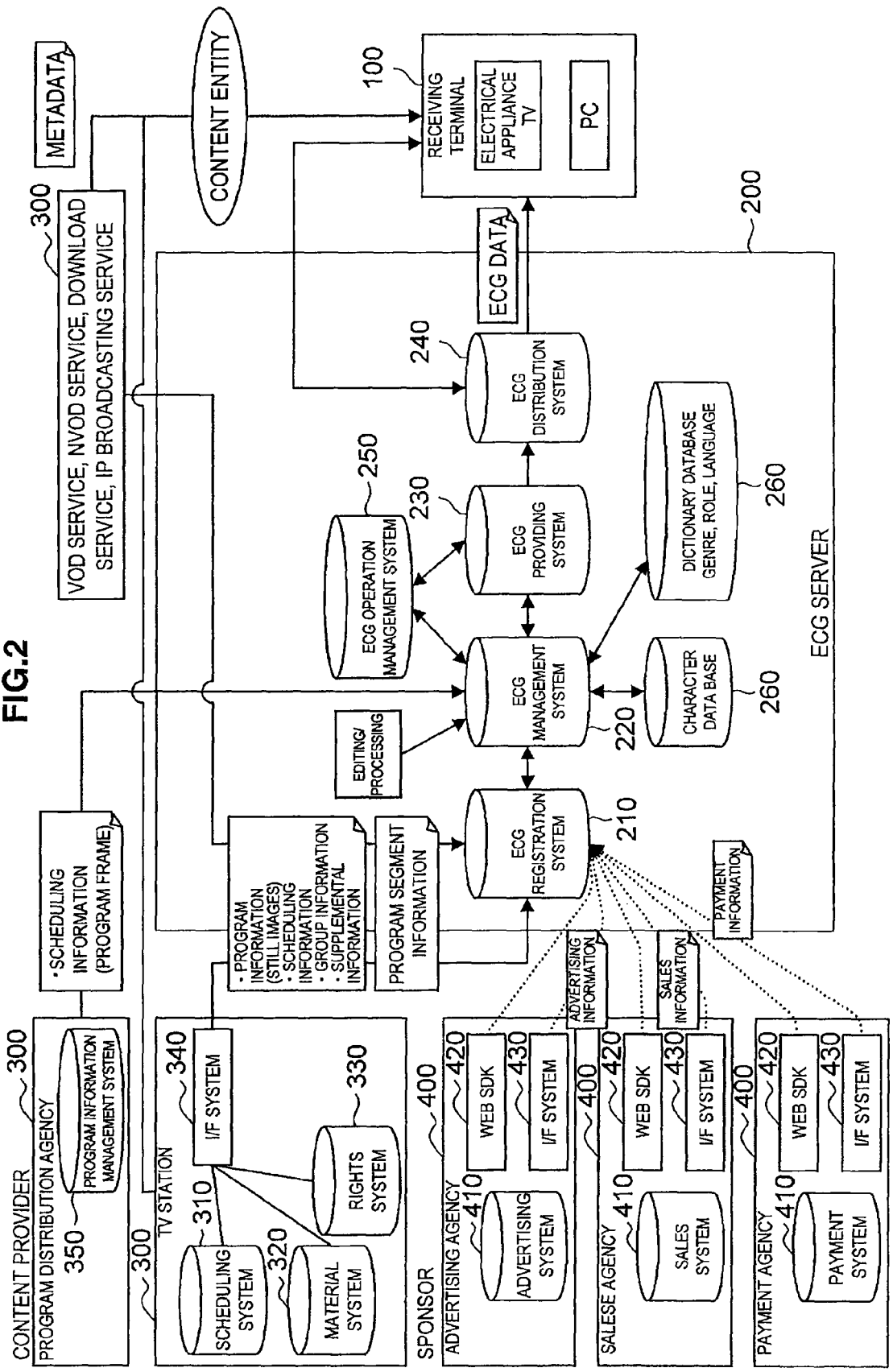
FIG. 2 is an explanatory view showing an example of the overall configuration model of an information providing system.

FIG. 2 is an explanatory view showing an example of the overall configuration model of an information providing system. Referring to FIG. 2, the information providing system includes the receiving terminal 100, the ECG server 200, a content provider 300 and a sponsor 400.

The content provider 300 may include a TV station, a data broadcast station, a program distribution agency and so on, for example. The content provider 300 provides information related to a program and detail information, which is described later, to the ECG server 200 together with video/audio information, data broadcast information and EPG-SI information related to a program to the receiving terminal 100. The information related to a program includes program information (including still image information), scheduling information, group information, supplemental information, program segment information and so on (which are collectively referred to hereinafter as program information).

The TV station operates a scheduling system 310, a material system 320, a right system 330 and so on which manage program information related to a program. The data broadcast station operates a program information management system which manages program information related to a provided program that is provided by video-on-demand (VOD), near video-on-demand (NVOD), download, IP broadcasting services or the like. The program distribution agency operates a program information management system 350 which manages program information (scheduling information) related to a distributed program.

The sponsor 400 may include an advertising agency, a sales agency, a payment agency and so on which provide advertising, sales and payment services, for example. In some cases, it may also include a content provider which provides video/audio information that is related to a program. The sponsor 400 provides service provision information related to a program which includes advertising information, sales information, payment information, program information and so on to the receiving terminal 100 through the ECG server 200.

The sponsor 400 operates different kinds of information processing system 410 according to business type such as advertising, sales or payment system, a Web software development kit (SDK) 420, an Interface (I/F) system 430 and so on. The sponsor 400 provides advertising information and sales information which introduce products or services that are sold or provided by an advertiser of the sponsor 400 or the sponsor 400 itself, for example. If the sponsor 400 is a payment agency, the sponsor 400 provides payment information in the processing of product purchase based on sales information. If the sponsor 400 is a content provider, the sponsor 400 provides program information which introduces a program that is provided or distributed by the sponsor 400.

(Overall Configuration of Information Providing Apparatus)

The ECG server 200 (information providing apparatus) is operated by an information service provider or the like which produces, manages, provides and distributes information related to a program as ECG data. The ECG server 200 includes an ECG registration system 210, an ECG management system 220, an ECG providing system 230, an ECG distribution system 240, an ECG operation management system 250, databases 260, and so on.

The ECG registration system 210 registers information related to a program (program information, service provision information etc.) which is provided from the content provider 300 and the sponsor 400. The databases 260 include a character database and a dictionary database, for example, and store detail information concerning program information such as program scheduling, cast, genre, music and event related to a program.

The ECG management system 220 manages the program information and the service provision information which are registered in the ECG registration system 210 and the detail information which is stored in the databases 260. The ECG management system 220 performs various editing and processing on the program information, the service provision information and the detail information. Particularly, the ECG management system 220 produces information related to a program as ECG data and establishes associations or set priorities among the ECG data, thereby editing a plurality of pieces of ECG data into an ECG scenario, as described in detail later.

Further, the ECG management system 220 produces program listing information which contains scheduling information of a plurality of programs as ECG data by performing editing and processing on the program information. The information provided as the program listing information which is produced as ECG data is not limited as electronic program guide (EPG) information of a related art, and the program listing information may contain information such as still images contained in program information, for example, in addition to information concerning a provision time and an overview of a program. The program listing information is in conjunction with scheduling information, and it is updated in real time according to a change in program scheduling or the like.

The ECG providing system 230 provides the ECG data such as an ECG scenario and program listing information which are managed by the ECG management system 220 to the receiving terminal 100 through the ECG distribution system 240. In response to a request from the receiving terminal 100, the ECG distribution system 240 provides the ECG data which is provided from the ECG providing system 230 to the receiving terminal 100. The ECG operation management system 250 controls the ECG management system 220 and the ECG providing system 230, thereby managing the entire system operation of the ECG server 200.

In the ECG server 200, the ECG registration system 210, the ECG management system 220 and the databases 260, for example, serve as an ECG scenario storage portion 270 or the like, which is described later. The ECG providing system 230 serves as an ECG scenario extracting portion 274, an ECG data selecting portion 278, an operation information generating portion 282 and so on, which are also described later. The ECG distribution system 240 serves as a designation information receiving portion 272, an ECG scenario transmitting portion 276, a function information receiving portion 280, an operation information transmitting portion 284, a control portion 286 and so on, which are also described later. Such a configuration is illustrated by an example only, and the configuration of the ECG server 200 is not limited to the above-described configuration.

(Configuration of Receiving Terminal)

Figure 3:
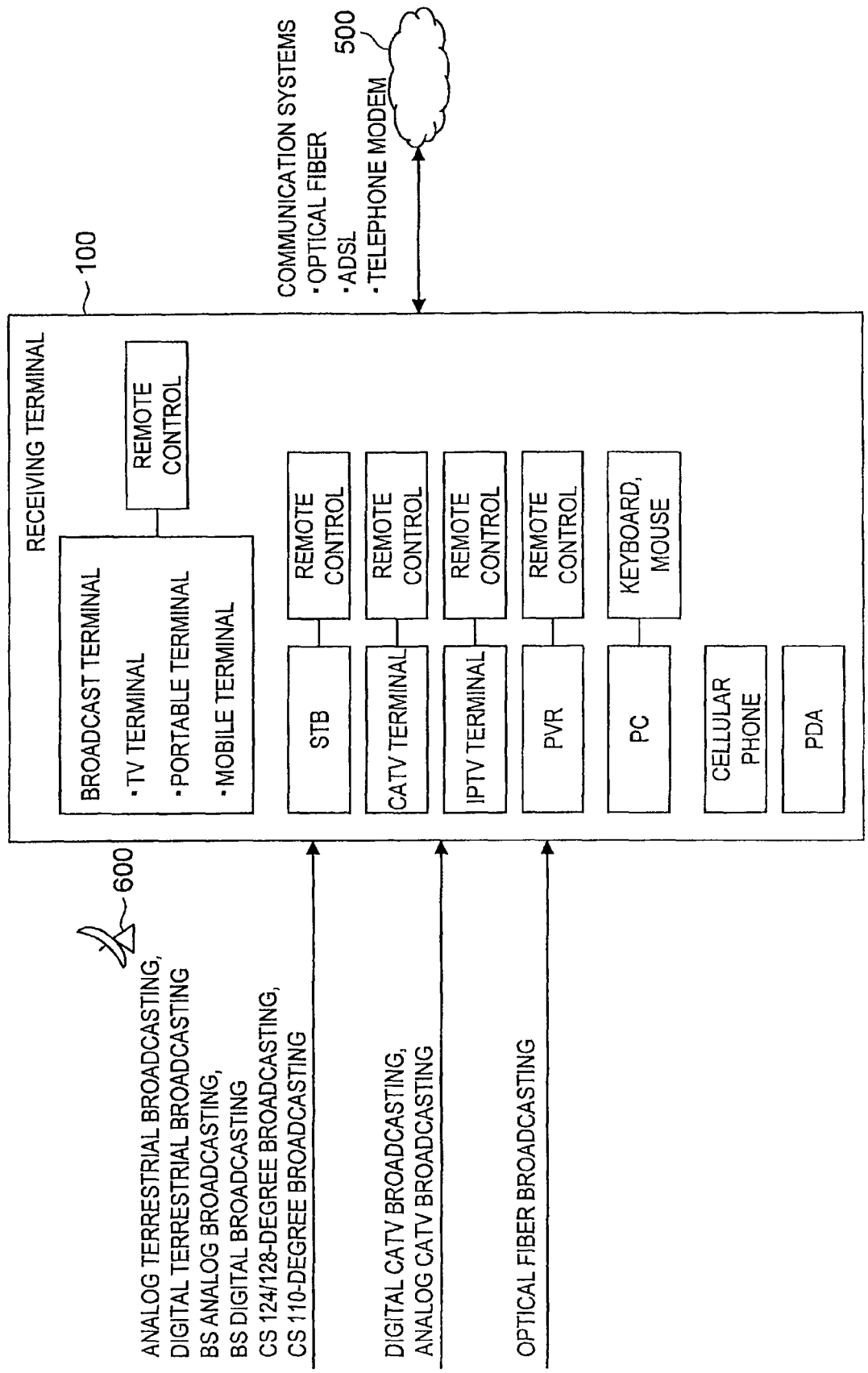
FIG. 3 is an explanatory view conceptually showing an example of the configuration of a receiving terminal which is included in an information providing system.

FIG. 3 is an explanatory view conceptually showing the exemplary configuration of a receiving terminal (information receiving terminal) which is included in an information providing system. Referring to FIG. 3, the receiving terminal 100 may be a receiving terminal such as a TV terminal, a portable terminal or a mobile terminal, a set top box (STB), a CATV terminal, an internet protocol television (IPTV) terminal, a personal video recorder (PVR), a personal computer (PC), a cellular phone or a personal digital assistant (PDA), for example.

The receiving terminal 100 receives programs which are provided through various transmission lines, such as analog terrestrial broadcasting, digital terrestrial broadcasting, broadcast satellite (BS) analog broadcasting, BS digital broadcasting, communication satellite (CS) 124/128-degree broadcasting, CS 110-degree broadcasting, digital common antenna television (CATV) broadcasting, analog CATV broadcasting and optical fiber broadcasting, for example, through the receiving antenna 600 or the like. Further, the receiving terminal 100 communicates with an external system and an external device through the communication network 500 which includes an optical fiber, asymmetric digital subscriber line (ADSL), a telephone modem or the like, for example.

The receiving terminal 100 may be operated using a remote control, a keyboard, a mouse and so on. A remote control 190 for the receiving terminal 100 may include a channel selection button for selecting the channel of a program to be received, an up/down/left/right button, an enter button, a return button and so on, for example. A user of the receiving terminal 100 can directly select the channel of a program which is currently viewable by operating the channel selection button. Alternatively, a user can select the channel of a selected program by selecting a desired program through the operation of the up/down/left/right button based on program listing information (channel selection menu) and then operating the enter button. The up/down/left/right button, the enter button and the return button may be operated in the same manner for the selection and determination of various information, besides the program channel selection.

The remote control 190 may further include an EPG-SI information button, a data broadcast information button, an ECG service button and so on, for example. A user can obtain the provision of EPG-SI information and data broadcast information from the content provider 300 by operating the EPG-SI information button and the data broadcast information button, respectively. A user can also obtain the provision of an ECG service from the ECG server 200 by operating the ECG service button.

Although the operation method using the remote control 190 is described above, the operation method using a keyboard, a mouse or an operating portion in the main body of the receiving terminal 100 is substantially the same as the operation method using the remote control 190, and a detailed description is omitted.

Figure 4:
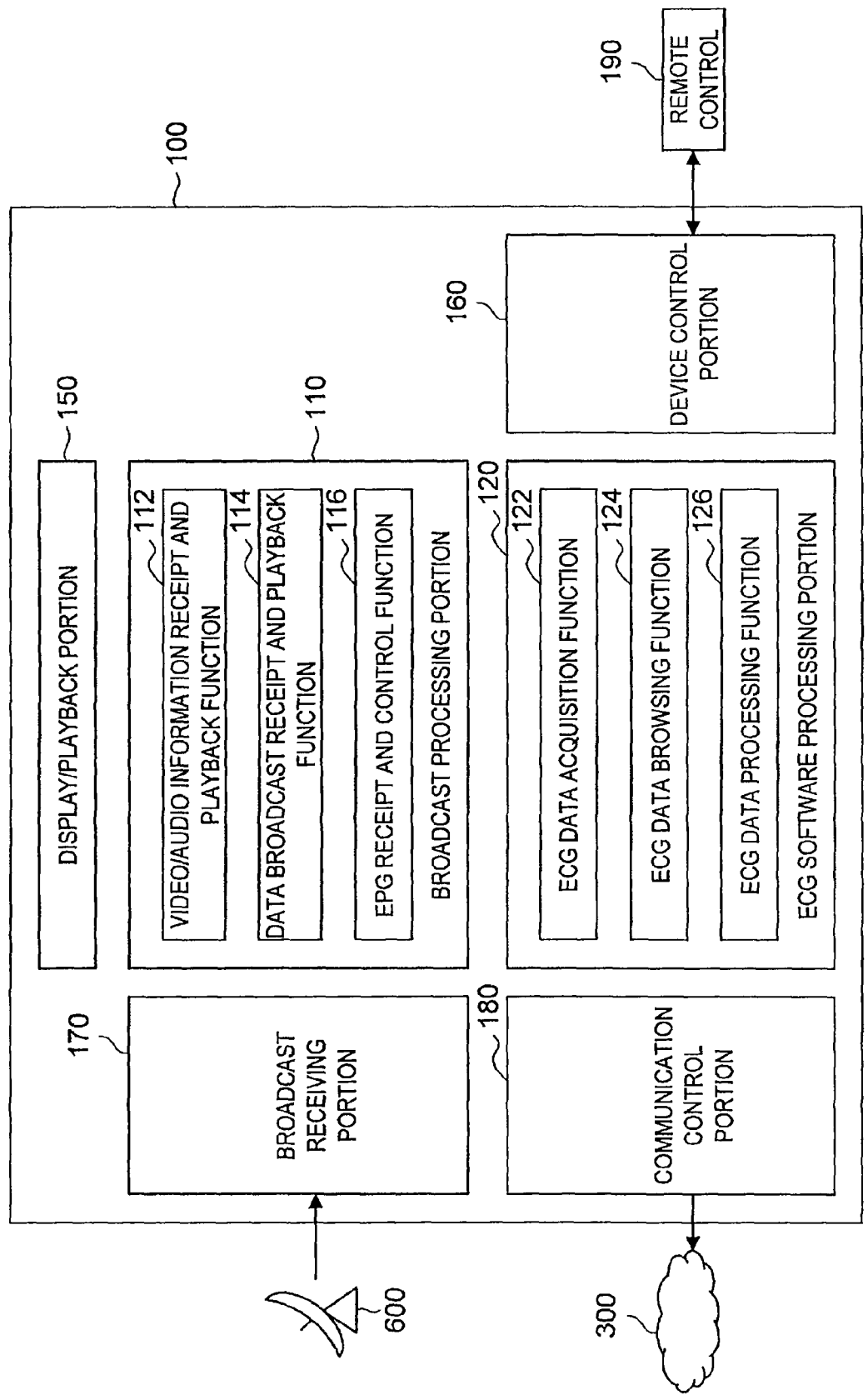
FIG. 4 is an explanatory view conceptually showing the functional configuration of a receiving terminal.

FIG. 4 is an explanatory view conceptually showing the functional configuration of a receiving terminal. Each functional block of the receiving terminal 100 is controlled by a computer system which includes CPU or the like. A storage portion which is included in the receiving terminal 100 and/or a recording medium which is removable from the receiving terminal 100 stores a program for causing each functional block to be functioning.

Referring to FIG. 4, the receiving terminal 100 includes a broadcast processing portion 110, an ECG software processing portion 120, a display/playback portion 150 and a device control portion 160. The broadcast processing portion 110 includes a video/audio information receipt and playback function 112, a data broadcast receipt and playback function 114 and an EPG receipt and control function 116. The ECG software processing portion 120 includes an ECG data acquisition function 122, an ECG data browsing function 124 and an ECG data processing function 126.

In the receiving terminal 100, with the function of the ECG data acquisition function 122, the ECG software processing portion 120 serves, in conjunction with the communication control portion 180, as a designation information transmitting portion 130, an ECG scenario receiving portion 132, a function information transmitting portion 140, an operation information receiving portion 142 and so on, which are described later. With the functions of the ECG data browsing function 124 and the ECG data processing function 126, the ECG software processing portion 120 serves as an ECG data selecting portion 134, an operation information generating portion 138, a control portion 146 and so on, which are also described later. The display/playback portion 150 serves, in conjunction with the broadcast processing portion 110, the ECG software processing portion 120, the device control portion 160 and so on, as a display/playback portion 136 or the like, which is described later. Further, the remote control 190 serves as an operation input portion 144 or the like, which is described later. Such a configuration is illustrated by an example only, and the configuration of the receiving terminal 100 is not limited to the above-described configuration.

(Element of Receiving Terminal and ECG Server)

FIGS. 5 and 6 are block diagrams showing the main elements of the information providing system according to this embodiment. The information providing system shown in FIG. 6 is an alternative example of the information providing system shown in FIG. 5.

The main elements of the information providing system shown in FIG. 5 are described firstly. The receiving terminal 100 shown in FIG. 5 includes a designation information transmitting portion 130, an ECG scenario receiving portion 132, an ECG data selecting portion 134, a display/playback portion 136, an operation information generating portion 138, an operation input portion 144 and a control portion 146.

The designation information transmitting portion 130 transmits designation information which designates a program to the ECG server 200. The ECG scenario receiving portion 132 receives the ECG scenario which is extracted from ECG scenarios that are stored in association with a program so as to be appropriate for a designated program from the ECG server 200. Each ECG scenario is composed of a plurality of pieces of ECG data to which each provision period is settable. The ECG data selecting portion 134 selects the ECG data to which a provision period corresponding to a provision time point of an ECG scenario is set from a plurality of pieces of ECG data that constitute a received ECG scenario as ECG data which constitutes an ECG scenario. The display/playback portion 136 displays and plays back an ECG scenario, video/audio information of a program and so on. The operation information generating portion 138 generates operation information which is appropriate for function information that specifies its own function and the temporal relationship between a provision time of a program and a provision time point of an ECG scenario for the operation regarding an ECG scenario. The operation input portion 144 receives an operation input by a user such as designation of a program and operation regarding an ECG scenario. The control portion 146 controls the function of the entire elements of the receiving terminal 100 described above.

The ECG server 200 shown in FIG. 5 includes an ECG scenario storage portion 270, a designation information receiving portion 272, an ECG scenario extracting portion 274, an ECG scenario transmitting portion 276 and a control portion 286.

The ECG scenario storage portion 270 stores an ECG scenario which is composed of a plurality of pieces of ECG data to which each provision period is settable in association with a program. The designation information receiving portion 272 receives designation information from the receiving terminal 100, and the ECG scenario extracting portion 274 extracts an ECG scenario which is appropriate for a designated program from the ECG scenario storage portion 270. The ECG scenario transmitting portion 276 transmits an extracted ECG scenario to the receiving terminal 100. The control portion 286 controls the function of the entire elements of the ECG server 200 described above.

The main elements of the information providing system shown in FIG. 6 are described next. The elements which are identical to the main elements of the information providing system shown in FIG. 5 are not repeatedly described below. A receiving terminal 100' shown in FIG. 6 includes the designation information transmitting portion 130, the ECG scenario receiving portion 132, the display/playback portion 136, a function information transmitting portion 140, an operation information receiving portion 142, the operation input portion 144 and the control portion 146. The receiving terminal 100' has the function information transmitting portion 140 and the operation information receiving portion 142 in place of the ECG data selecting portion 134 and the operation information generating portion 138 which are the elements of the receiving terminal 100 shown in FIG. 5.

The function information transmitting portion 140 transmits function information which specifies its own function to an ECG server 200'. The operation information receiving portion 142 receives operation information which is generated to be appropriate for its own function and the temporal relationship between a provision time of a program and a provision time point of an ECG scenario from the ECG server 200'.

The ECG server 200' shown in FIG. 6 includes the ECG scenario storage portion 270, the designation information receiving portion 272, the ECG scenario extracting portion 274, the ECG scenario transmitting portion 276, the control portion 286, an ECG data selecting portion 278, a function information receiving portion 280, an operation information generating portion 282 and an operation information transmitting portion 284. The ECG server 200' has the ECG data selecting portion 278, the function information receiving portion 280, the operation information generating portion 282 and the operation information transmitting portion 284 in addition to the elements of the ECG server 200 shown in FIG. 5.

The ECG data selecting portion 278 selects the ECG data to which a provision period corresponding to a provision time point of an ECG scenario is set from a plurality of pieces of ECG data that constitute an extracted ECG scenario as ECG data which constitutes an ECG scenario. The function information receiving portion 280 receives function information which specifies the function of the receiving terminal 100' from the receiving terminal 100'. The operation information generating portion 282 generates operation information which is appropriate for the received function information and the temporal relationship between a provision time of a program and a provision time point of an ECG scenario for the operation regarding an ECG scenario. The operation information transmitting portion 284 transmits the generated operation information to the receiving terminal 100'.

In the information providing system shown in FIG. 5, the selection of ECG data and the generation of operation information are performed in the receiving terminal 100. On the other hand, in the information providing system shown in FIG. 6, the selection of ECG data and the generation of operation information are performed in the ECG server 200'. In the information providing systems shown in FIGS. 5 and 6, the arrangement of the elements which have the functions regarding the selection of ECG data and the generation of operation information may be replaced between the receiving terminal 100, 100' and the ECG server 200, 200'. For example, the selection of ECG data may be performed in the receiving terminal 100, 100', and the generation of operation information may be performed in the ECG server 200, 200'.

(Structure of ECG Scenario)

FIG. 7 is an explanatory view showing the exemplary structure of ECG data which are contained in an ECG scenario. Referring to FIG. 7, an ECG scenario contains program information related to a program, service provision information related to program information, and association information which establishes association among a program, program information and service provision information. An ECG scenario is a collection of ECG sets, each set being a combination of each program information and service provision information associated with each program information. The ECG set may be composed of program information only, without including service provision information. Further, priorities may be set to the ECG sets which constitute an ECG scenario and to the program information and the service provision information which constitutes each ECG set as described below.

In the ECG scenario which is illustrated in FIG. 7, the program information which are associated with the program A10 include "scheduled date and time" 22, "performer A" 32, "drama" 42, "music A" 52, "event A" 62, "program introduction A" 72, "feature A" 82 and "synopses A" 92. The program information are classified into categories of scheduling information, cast, genre, music, event, program introduction, feature and synopses, respectively.

Further, the service provision information is associated with each program information. For example, the service provision information "DVD" 34, "book" 36 and "goods" 38 are associated with the program information "performer A" 32. Thus, one ECG set 30 which includes the program information "performer A" 32 and the service provision information "DVD" 34, "book" 36 and "goods" 38 is formed. Further, an ECG scenario which is a collection of all or part of the ECG sets 20 to 90 that respectively correspond to the program information is formed.

Priorities "(1)" to "(8)" are respectively set to the ECG sets 20 to 90 which respectively correspond to the program information "scheduled date and time" 22, "performer A" 32, "drama" 42, "music A" 52, "event A" 62, "program introduction A" 72, "feature A" 82 and "synopses A" 92. Further, priorities are also set to the program information and the service provision information according to the priorities of the ECG sets. For example, priorities "3)", "4)", "5)" and "6)" are respectively set to the program information "performer A" 32 and the service provision information "DVD" 34, "book" 36 and "goods" 38 which are associated with the program information "performer A" 32.

Accordingly, in the execution of the ECG scenario, after the program information "performer A" 32 is displayed, the service provision information "DVD" 34, "book" 36 and "goods" 38 which are associated with the program information "performer A" 32 are sequentially displayed, and then the program information "drama" 42 with the priority "7)" is displayed after that.

The ECG scenario contains program information and service provision information and is associated with detail information concerning the program information and detail information concerning the service provision information.

The detail information concerning program information includes detail information about program scheduling and cast, detail information about music and event related to a program and so on, for example. The detail information concerning service provision information includes, if it is the service provision information about sales, information about purchase and payment procedure, for example. If it is the service provision information about advertising information, the detail information concerning the service provision information includes detail information of advertisement, for example. If it is the service provision information about program information, the detail information concerning the service provision information includes information about recording/viewing reservation of a program, for example.

The detail information concerning program information is provided from the ECG server 200 to the receiving terminal 100 in response to a request of a user which is made while the relevant program information is displayed. The detail information concerning service provision information is provided from the sponsor 400 to the receiving terminal 100 through the ECG server 200 in response to a request of a user which is made while the relevant service provision information is displayed. The detail information concerning service provision information may include information about processing such as purchase and payment procedure, questionnaire and recording/viewing reservation, for example, and prescribed processing is performed between a user and the sponsor 400 through the receiving terminal 100 based on the information.

(Metadata of ECG Scenario)

FIGS. 8A to 8C and 9A to 9C are explanatory views showing examples of metadata which constitute an ECG scenario.

FIGS. 8A to 8C and 9A to 9C illustrate metadata of program information, service provision information, association information for establishing association among a program, program information and service provision information, an ECG scenario and an ECG set, respectively. The structures of an ECG scenario and an ECG set are described in detail later using specific examples.

The metadata of program information shown in FIG. 8A contain description of information such as a program genre, a keyword and a cast. In the metadata, "P00001", "professional style", "documentary", "AAAAAA BBBBBB know-how impression" are described as an program ID, a program name, a genre and a keyword, respectively. Further, "2007/7/10 22:00:00" and "2007/7/10 23:00:00" are described as the provision start date and time and the provision end date and time of the program, respectively. Furthermore, the casts who appear on the program are described, and it is described for the cast with the person ID "1_1" that a name is "AAAAAA" and a birthplace is "Japan", for example. In addition, "AA1" and "L00001" are described as an association ID (relation ID) for the metadata and a reference ID list for association information of the program, respectively.

The metadata of service provision information shown in FIG. 8B contains descriptions of information such as a service provision information genre, a keyword, a place to obtain detail information and so on. In the metadata, "C00001", "product 1", "publication", "XXX YYY ZZZ", "zony", "100 yen" and "www.zony.co.jp" are described as a service provision information ID (content ID), a service provision information name, a genre, a keyword, a maker, a price, and a place to obtain detail information, respectively.

The metadata of association information for establishing association among a program, program information and service provision information shown in FIG. 8C contains descriptions of information such as genres of program information and service provision information to be associated with a program and so on. In the metadata, "L00001", "HHH", "2007/7/10 22:00:00" and "2007/7/10 23:00:00" are described as a program association ID (program relation ID), a program association name, the start date and time and the end date and time of association, respectively. Further, "1", "P00001", and "shopping" are described as a program ID to be associated (link program ID), a program ID and a genre, respectively. Furthermore, service provision information to be associated are described, and it is described for the service provision information with the service provision information ID (content ID) to be associated (link content ID) "1" that a service provision information ID is "C00001" and a genre is "sport".

The metadata of an ECG scenario shown in FIG. 9A contains descriptions of information of ECG sets which constitute the ECG scenario. In the metadata, "sc00011", "ECG scenario", "2007/7/1 00:00:00" and "2007/7/20 00:00:00" are described as an ECG scenario ID, an ECG scenario name, and the provision start date and time and the provision end date and time (or a valid period) of the ECG scenario, respectively. In addition, it is described that the provision date and time of a program to which the ECG scenario is associated is from 22:00 to 23:00 on 2007/7/10. Further, an ECG set 1 and an ECG set 2 which constitute an ECG scenario are designated, and it is described that an item ID (ecg set content ID) and an ECG set ID of the ECG data which constitute each ECG set are "ecg_set_c1" and "es00001" and "ecg_set_c2" and "es00002", respectively.

The metadata of an ECG set shown in FIG. 9B contains descriptions of information such as program information and service provision information which constitute the ECG set 1 described above. In the metadata, "es00001", "ECG set 1", "2007/7/1 00:00:00" and "2007/7/20 00:00:00" are described as an ECG set ID, an ECG set name, and the provision start date and time and the provision end date and time (or a valid period) of the ECG set, respectively. Further, four pieces of ECG data with the item ID (content ID) "c11", "c12", "c13" and "c14" which constitute the ECG set 1 are described. For example, it is described for the ECG data with the item ID "c11" that a data type, a program information ID, provision start date and time and provision end date and time are "program (program information)", "P011", "2007/7/1 00:00:00" and "2007/7/10 22:00:00", respectively. On the other hand, it is described for the ECG data with the item ID "c14" that a data type, a program information ID, provision start date and time and provision end date and time are "product (product information)", "C011", "2007/7/1 00:00:00" and "2007/7/20 00:00:00", respectively.

The provision start date and time and the provision end date and time of the ECG data with the item ID "c11", "c12" and "c13" which correspond to program information are set to the period before the program provision date and time (22:00 to 23:00 on 2007/7/10), the period of the program provision date and time (viewable period), and the period after the program provision date and time, respectively. On the other hand, the provision start date and time and the provision end date and time of the ECG data with the item ID "c14" which corresponds to service provision information is set to the period before and after the program provision date and time including the program provision date and time. Thus, when the ECG scenario which contains the ECG set 1 is executed, the ECG data with the item ID "c11", "c12" and "c13" are displayed as program information sequentially in the period before the program provision date and time, the period of the program provision date and time, and the period after the program provision date and time. On the other hand, the ECG data with the item ID "c14" is displayed as service provision information in the period before and after the program provision date and time including the program provision date and time.

The metadata of an ECG set shown in FIG. 9C contains descriptions of information such as program information and service provision information which constitute the ECG set 2 described above. In the metadata, three pieces of ECG data with the item ID "c21", "c22" and "c23" which constitute the ECG set 2 are described.

The provision start date and time and the provision end date and time of the ECG data with the item ID "c21" and "c22" which correspond to program information are set to the period from a point before the program provision date and time (22:00 to 23:00 on 2007/7/10) to the program provision date and time (viewable period), and the period after the program provision date and time, respectively. On the other hand, the provision start date and time and the provision end date and time of the ECG data with the item ID "c23" which corresponds to service provision information is set to the period before and after the program provision date and time including the program provision date and time. Thus, when the ECG scenario which contains the ECG set 2 is executed, the ECG data with the item ID "c21" and "c22" are displayed as program information sequentially in the period from a point before the program provision date and time to the provision date and time, and the period after the program provision date and time. On the other hand, the ECG data with the item ID "c23" is displayed as service provision information in the period before and after the program provision date and time including the program provision date and time.

Alternatively, the provision start date and time and the provision period may be set rather than setting the provision start date and time and the provision end date and time of each ECG data. Further, whether or not to display (provide) each ECG data may be set in each of the period before the program provision date and time, the period of the program provision date and time, and the period after the program provision date and time.

(Establishment of Association Between Program and ECG Scenario)

Figure 10:
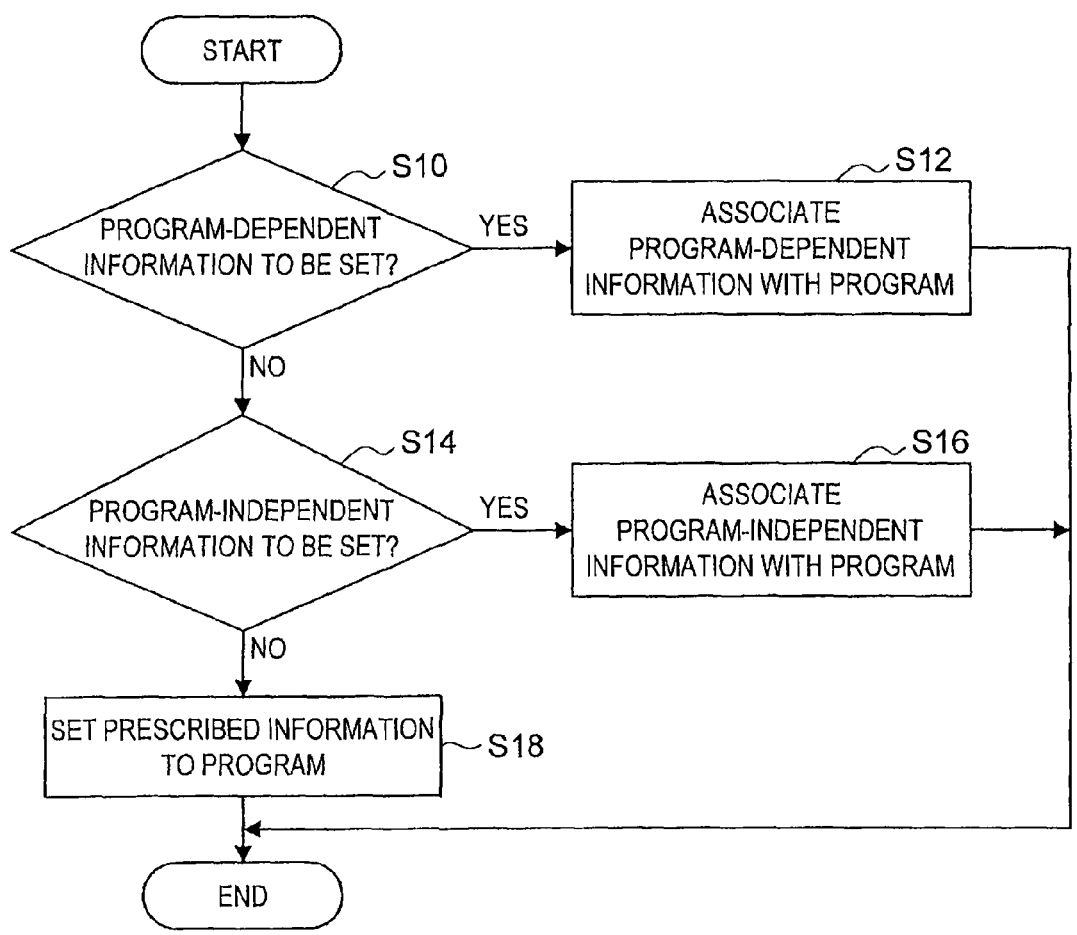
FIG. 10 is a flowchart showing an example of a procedure to associate an ECG scenario with a program.

FIG. 10 is a flowchart showing an example of the procedure to associate an ECG scenario with a program.

Referring to FIG. 10, when associating related information (ECG scenario) with a program, it is determined whether to set an ECG scenario which contains program-dependent information (S10). If it is determined to set such an ECG scenario, the ECG scenario which contains program-dependent information is associated with the program (S12). On the other hand, if it is determined not to set such an ECG scenario, it is further determined whether to set an ECG scenario which contains program-independent information (S14). If it is determined to set such an ECG scenario, the ECG scenario which contains program-independent information is associated with the program (S16). On the other hand, if it is determined not to set such an ECG scenario, an ECG scenario which contains prescribed information such as a name and a logotype for the content provider 300, for example, is set (S18).

The program-dependent information is information which is directly related to a program, which is ECG data as shown in FIG. 7, for example. On the other hand, the program-independent information is information which is not directly related to a program, which is ECG data such as a program that is scheduled to be provided, VOD content that is not dependent on program scheduling, information related to a program that is recommended by the content provider 300 or information different from a program that is provided from the content provider 300, for example.

If an ECG scenario which contains program-independent information is associated with a program, the following advantages are expected. For example, if ECG data which is related to a program that is scheduled to be provided is associated, the content provider 300 can prompt a user to view the program, and a user can easily make recording reservation or viewing reservation of the program. Further, if ECG data which is related to a VOD content that is not dependent on program scheduling is associated, the content provider 300 can prompt a user to view the content, and a user can easily purchase and view the content. A plurality of ECG scenarios may be associated with a program, and priorities may be set to the ECG scenarios in such a case.

Figure 11:
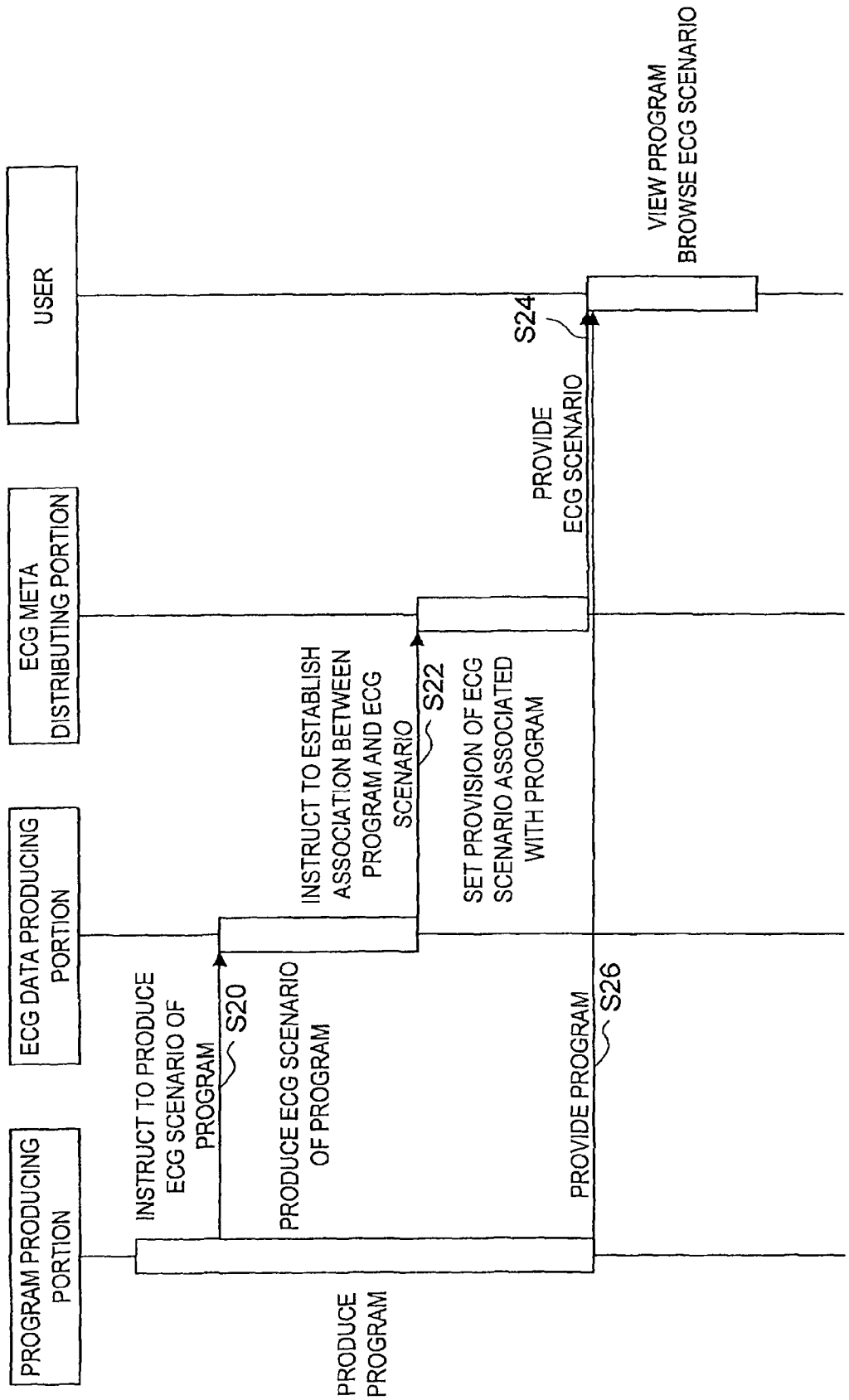
FIG. 11 is a sequence chart showing a process flow from production to provision of a program and an ECG scenario.

FIG. 11 is a sequence chart showing the flow from the production to the provision of a program and an ECG scenario.

Referring to FIG. 11, a program producing portion such as the content provider 300 produces a program and instructs an ECG data producing portion to produce related information (ECG scenario) (S20). The ECG data producing portion, which is a part of the ECG server 200, produces an ECG scenario based on the instruction from the program producing portion and then instructs an ECG meta distributing portion to associate the ECG scenario with the program (S22). The ECG meta distributing portion, which is also a part of the ECG server 200, makes setting to provide the ECG scenario in association with the program. Then, the ECG meta distributing portion provides the ECG scenario which is associated with the program to a user (S24) in addition to providing the program from the program producing portion (content provider 300) (S26).

(Process Flow of ECG Scenario)

Figure 12:
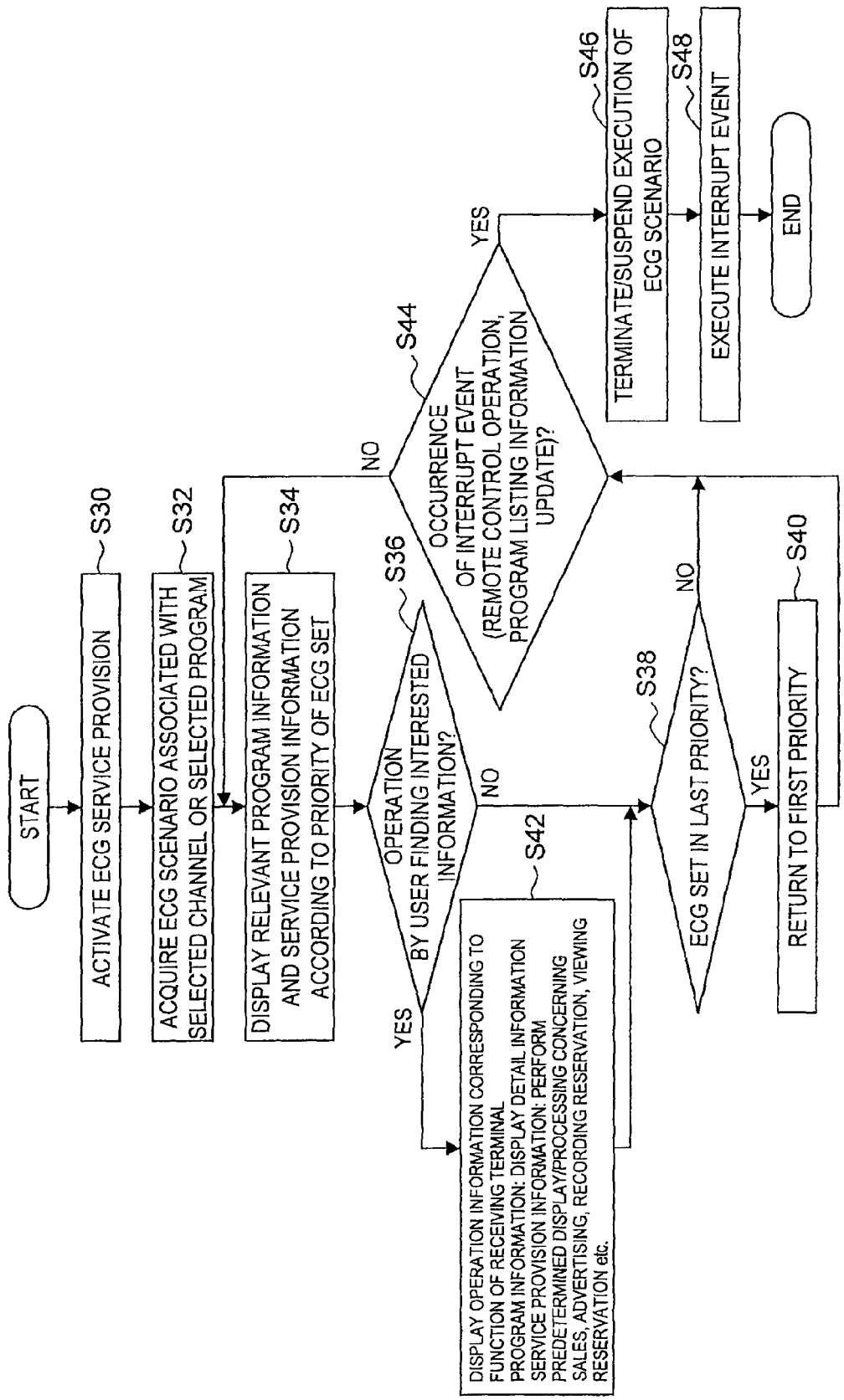
FIG. 12 is a flowchart showing a process flow in the execution of an ECG scenario.

FIG. 12 is a flowchart showing a process flow in the execution of an ECG scenario.

Prior to the execution of related information (ECG scenario), the provision of an ECG service is activated through the operation of the receiving terminal 100 by a user (S30). After the provision of an ECG service is activated, the ECG scenario which is associated with a selected channel or program is acquired from the ECG server 200 (S32). After the ECG scenario is acquired, the acquired ECG scenario is executed, and the program information and the service provision information which constitute the ECG scenario are sequentially displayed in units of ECG sets according to the priorities that are set thereto (S34). After the display of all the ECG sets which constitute the ECG scenario is completed (S38), the display of the ECG scenario is repeated according to the priorities (S40).

To each piece of ECG data which is contained in the ECG set, a provision period (provision start date and time and provision end date and time) is settable. In the display of the ECG scenario (S34), the ECG data (program information, service provision information) to which a provision period corresponding to provision date and time is selected and displayed. Alternatively, the ECG data to which a provision period corresponding to provision date and time may be selected and displayed in the acquisition of the ECG scenario (S32).

If a user finds interested information in the displayed program information and service provision information, the user performs determination operation (S36). When the determination operation is performed, the processing for the display of the detail information concerning the program information and the service provision information or the provision of services concerning the service provision information is performed according to the program information and the service provision information which are displayed at the time when the determination operation is performed (S42). In the processing of program information and service provision information (S42), appropriate operation information is generated and displayed according to function information which specifies the function of the receiving terminal 100.

During the execution of an ECG scenario, if an interrupt event such as remote control operation not related to the execution of the ECG scenario or update/change of program listing information occurs (S44), the execution of the ECG scenario is terminated or suspended (S46), and the interrupt event is executed (S48).

(Process Flow of Related Information)

Figure 13:
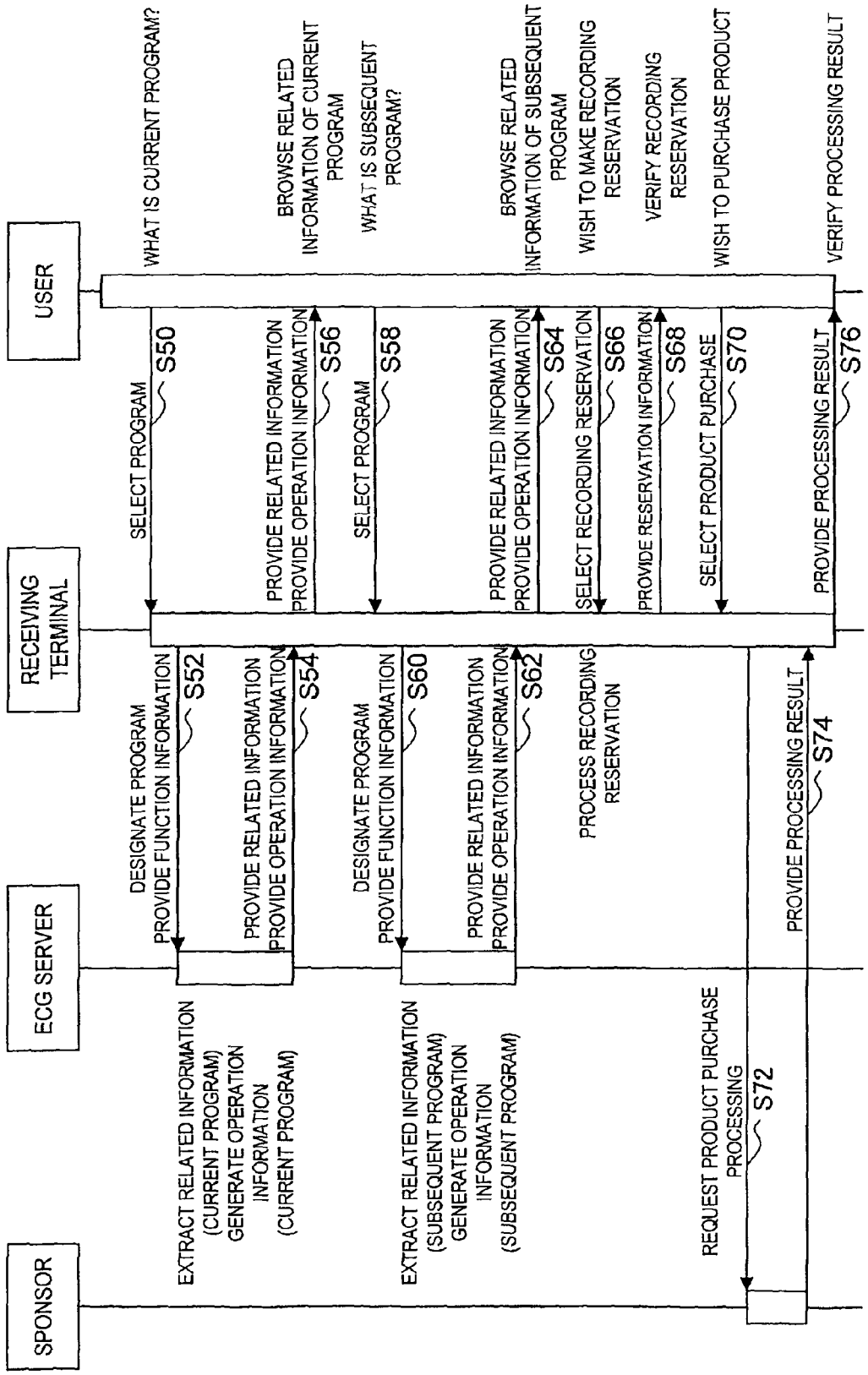
FIG. 13 is a sequence chart showing an example of a process flow of an ECG scenario in an entire information providing system.

FIG. 13 is a sequence chart showing an example of the process flow of an ECG scenario in the information providing system as a whole.

A user selects a currently viewable program by remote control operation or the like (S50). When a program is selected, the receiving terminal 100 transmits designation information which designates the selected program and function information which specifies the function of the receiving terminal 100 to the ECG server 200 (S52). The ECG server 200 extracts the ECG scenario (related information) of the relevant program based on the designation information, generates operation information corresponding to the function of the receiving terminal 100 based on the function information, and transmits the ECG scenario and the operation information to the receiving terminal 100 (S54). Then, the receiving terminal 100 receives and displays the video information of the program, the ECG scenario and the operation information, thereby providing the video information of the program and the ECG scenario regarding the currently viewable program together with the operation information corresponding to the function of the receiving terminal 100 to a user (S56).

A user may select a program which is scheduled to be provided in the time period that is later than the currently viewable program, for example (S58). When the program which is scheduled to be provided in the later time period is selected, the same processing as when the currently viewable program is selected is performed between the receiving terminal 100 and the ECG server 200 (S60, S62). Then, the receiving terminal 100 receives and displays the ECG scenario and the operation information, thereby providing the ECG scenario regarding the program which is scheduled to be provided in the later time period together with the operation information corresponding to the function of the receiving terminal 100 to a user (S64). If a provision period corresponding to the provision time point of an ECG scenario is set as the provision period of ECG data which is contained in the ECG scenario regarding the program scheduled to be provided in the later time period, the ECG data to which the period that is earlier than the provision date and time of the program is set is displayed.

As for the ECG scenario, the ECG data to which a provision period corresponding to a provision date and time is set is selected and displayed during the display by the receiving terminal 100 in the step S56, S64. Alternatively, for the ECG scenario, the ECG data to which a provision period corresponding to a provision date and time is set may be selected and provided during the transmission by the ECG server 200 in the step S54, S62.

The operation information may be generated in the receiving terminal 100 rather than in the ECG server 200. In this case, the receiving terminal 100 transmits designation information in the step S52, S60, and the ECG server 200 transmits an ECG scenario in the step S54, S62. Then, in the step S56, S64, the receiving terminal 100 generates operation information based on function information which specifies its own function and displays video information of a program and an ECG scenario together with the generated operation information.

When a user wishes to make recording reservation of a program which is scheduled to be provided in the later time period, the user selects recording reservation processing which is contained in the operation information (S66). When the recording reservation processing is selected, the receiving terminal 100 performs recording reservation processing based on the program information of the program scheduled to be provided in the later time period which is contained in the ECG scenario and provides reservation information for verification to the user (S68).

When a user wishes to purchase a product which is contained in service provision information, the user selects product purchase processing (S70). When the product purchase processing is requested, the receiving terminal 100 requests the sponsor 400 serving as a sales agency to perform the product purchase processing (S72) and acquires a result of the product purchase processing from the sponsor 400 (S74). The receiving terminal 100 transmits and receives information about a request for the product purchase processing and information about a result of the product purchase processing between the user and the sponsor 400 (S70 to S76). The product purchase processing is thereby performed between the user and the sponsor 400.

During the product purchase processing or the like, processing which does not accept the operation that is not related to the product purchase processing may be performed in the period from the start to the end of the processing, for example, in order to avoid interruption of the processing due to wrong operation by a user.

(Specific Description of ECG Scenario Providing Method)

Figure 14:
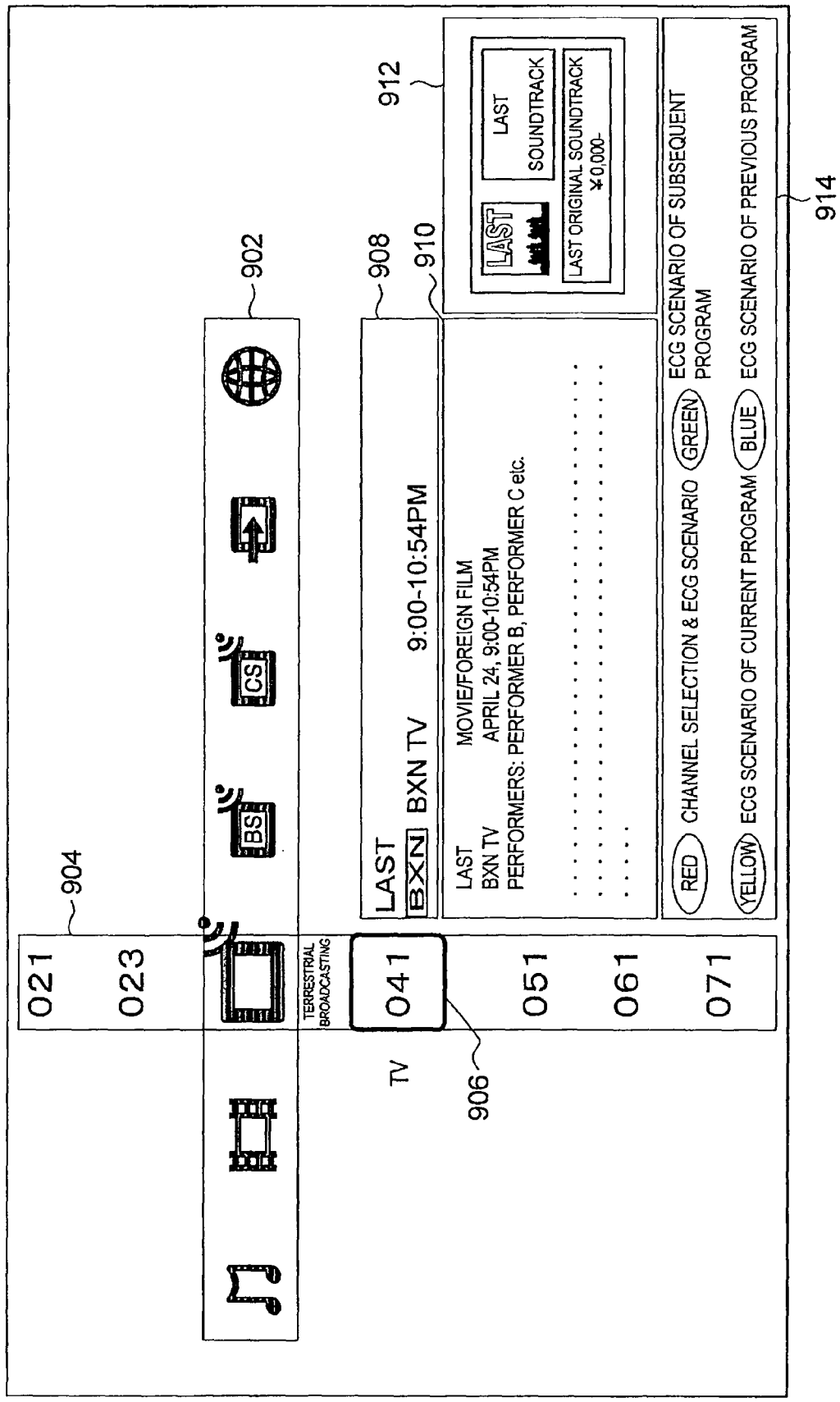
FIG. 14 is an explanatory view showing an example of a channel selection menu which is displayed in a receiving terminal.
Figure 15:
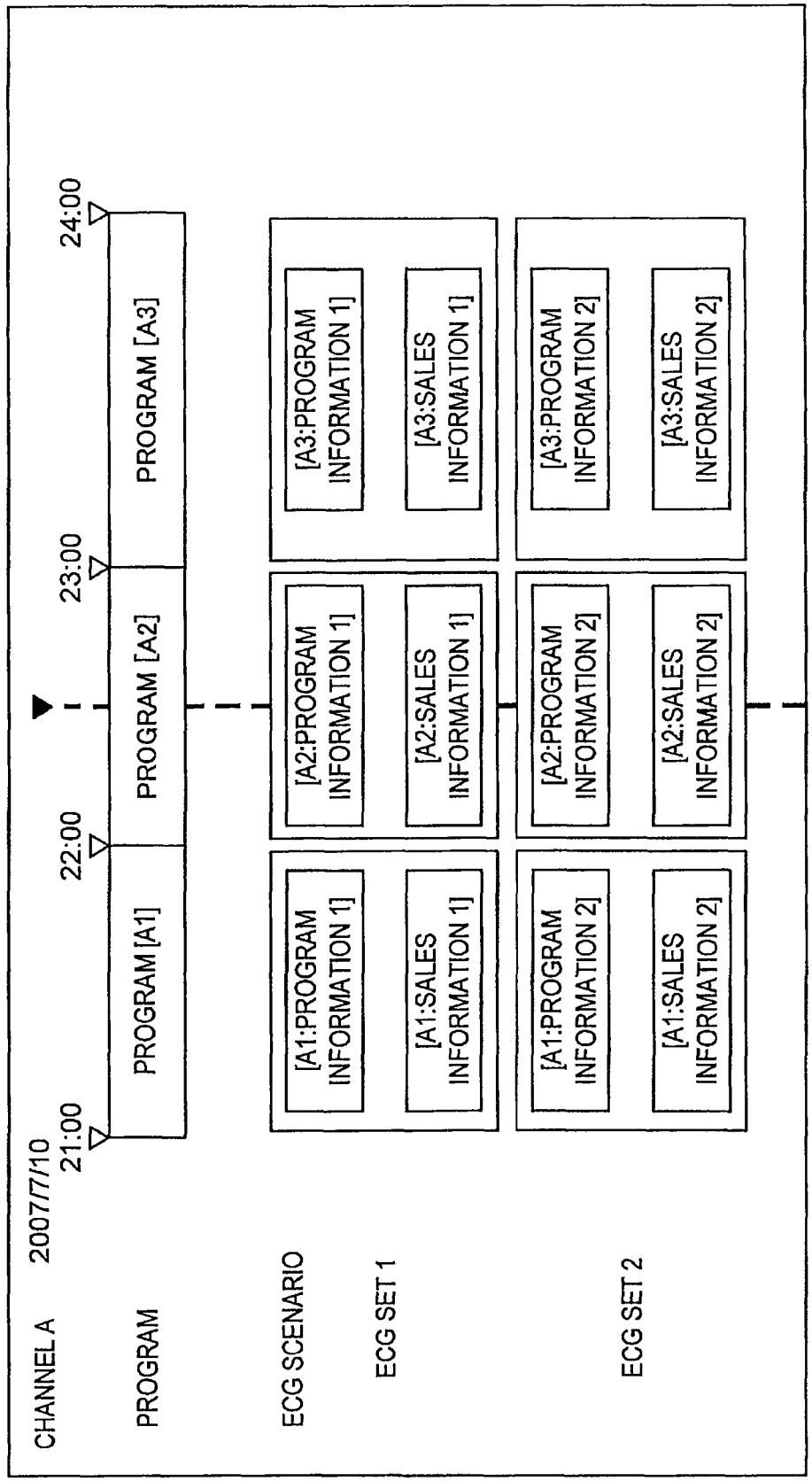
FIG. 15 is an explanatory view showing the structure of an ECG scenario according to provision date and time.
Figure 16:
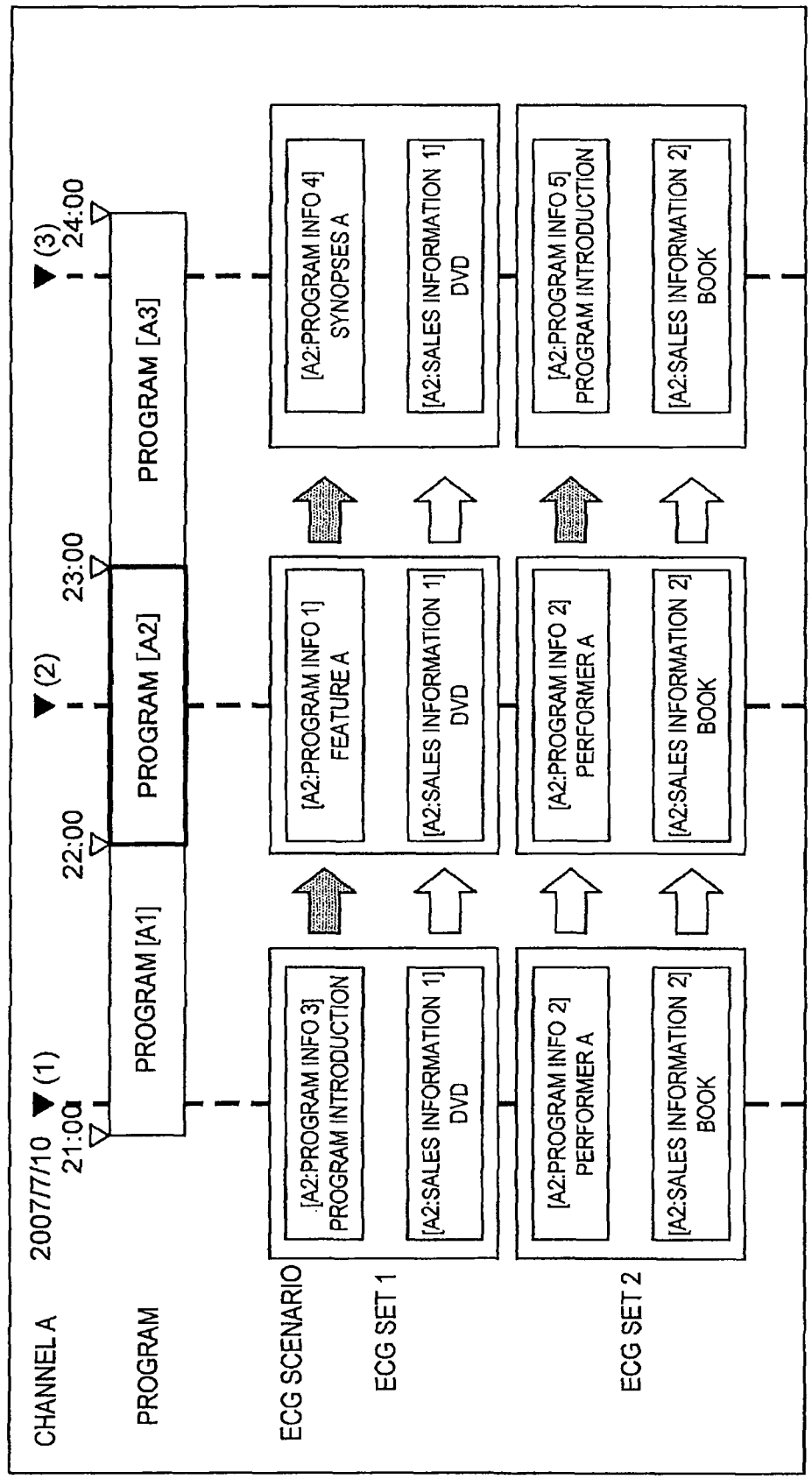
FIG. 16 is an explanatory view showing the structure of an ECG scenario according to provision date and time.
Figure 17:
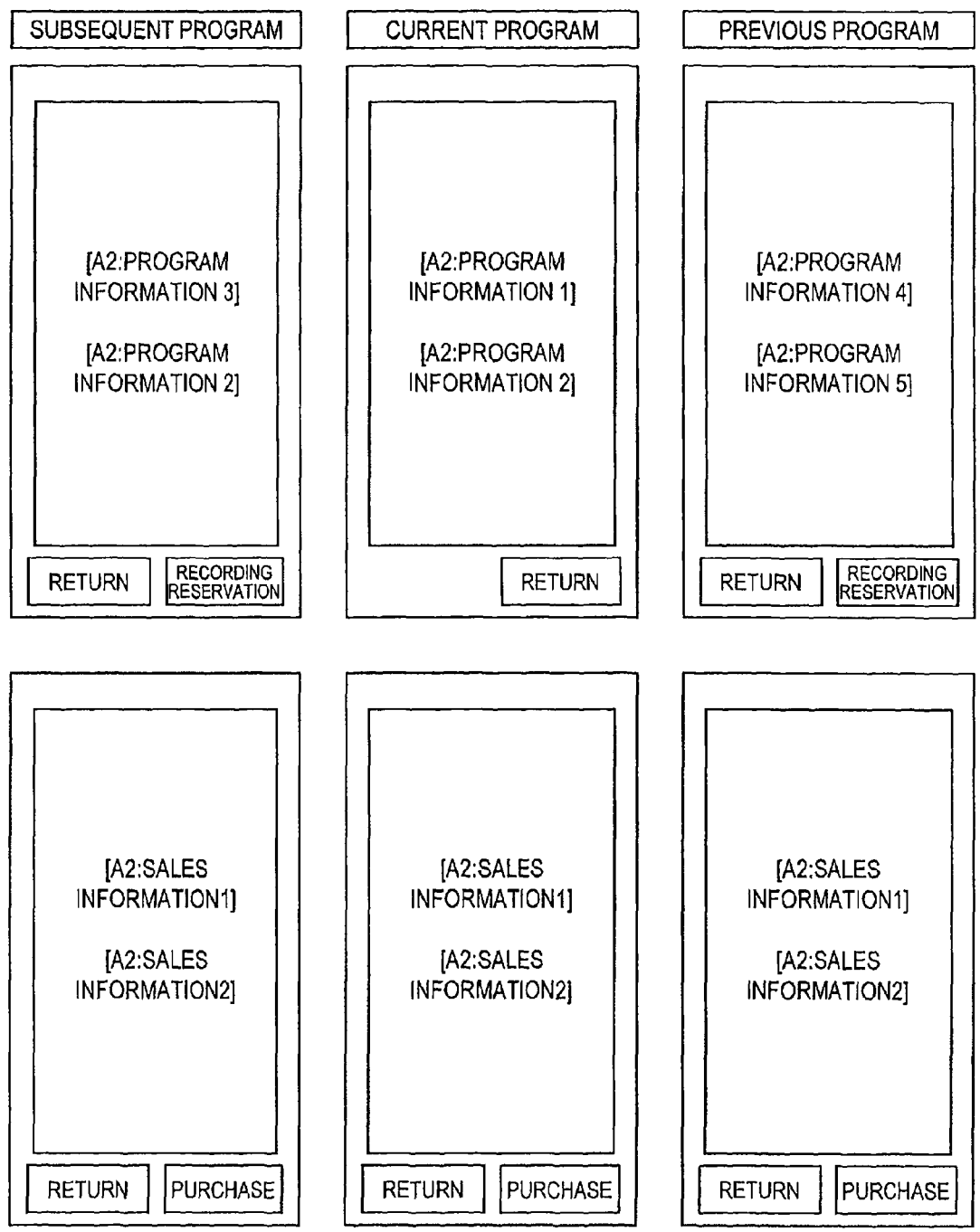
FIG. 17 is an explanatory view showing an example of the display of an ECG scenario.

A method of providing related information (ECG scenario) which is characteristic to this embodiment is described hereinafter using a specific example. FIG. 14 is an explanatory view showing an example of a channel selection menu which is displayed in a receiving terminal. FIGS. 15 and 16 are explanatory views showing the structure of an ECG scenario according to provision date and time. FIG. 17 is an explanatory view showing an example of the display of an ECG scenario. FIG. 18 is an explanatory view showing an example of the display of operation information.

In the receiving terminal 100, a channel selection menu as shown in FIG. 14 is executed and displayed upon startup or the like. In the central part of the channel selection menu, functional icons 902 for selecting available functions are displayed in a single horizontal row, and content icons 904 for selecting available contents for each function are displayed in a single vertical line, intersecting with the functional icons 902. The point of the intersection of the functional icon row and the content icon line is fixed to a predetermined position on the display screen.

The available functions may include playback of audio information, playback of video information, viewing of a terrestrial broadcast program, viewing of a satellite broadcast program, viewing of a cable broadcast program, viewing of an external input program, use of Internet and so on. The available contents may include various channels of TV stations which provide terrestrial broadcasting for a terrestrial broadcast program viewing function, for example.

A user can smoothly select the function and the content to use by horizontally scrolling the display of the functional icons 902 and vertically scrolling the display of the content icons 904 using the up/down/left/right button of the remote control 190, for example.

In the example shown in FIG. 14, the functional icon which indicates the viewing of a terrestrial broadcast program is selected, and the program of the channel "041" is selected as one of available contents by a cursor frame 906. On the right side of the cursor frame 906, a display frame 908 which indicates the name of the currently viewable program in the relevant channel is displayed. In the lower right of the cursor frame 906, a basic information display frame 910 which displays basic information of a program (program name, category, broadcast station name, scheduled broadcast date and time, cast, overview summary etc.) and an ECG scenario display frame 912 which displays an ECG scenario are displayed.

The name of the currently viewable program, the basic information and the ECG scenario may be switched appropriately according to the selection operation of the function and the content. Specifically, designation information which designates a selected content (program) is transmitted to the ECG server 200, and then the program information, the ECG scenario and so on which correspond to the designated program are transmitted to the receiving terminal 100 and displayed.

In the ECG server 200, related information (ECG scenario) is stored in association with a time-scheduled program as shown in FIG. 15, for example. In the example of FIG. 15, programs A1, A2 and A3 are scheduled for 21:00 to 22:00, 22:00 to 23:00 and 23:00 to 24:00 on 2007/7/10, respectively, as programs of a channel A. To each program, an ECG scenario which is composed of an ECG set 1 and an ECG set 2 is associated. When the program A2 is selected during the provision period of the program A2 (22:00 to 23:00), the ECG scenario composed of the ECG set 1 and the ECG set 2 which contain the ECG data concerning the program A2 is transmitted to the receiving terminal 100 and displayed. Likewise, when the program A1 is selected during the provision period of the program A1 and when the program A3 is selected during the provision period of the program A3, the ECG scenario which is associated with the selected program is transmitted to the receiving terminal 100 and displayed in the same manner.

Below the display frames 910 and 912, an operation information display frame 914 which displays operation information for prompting a user to operate the remote control 190 is displayed. In the example of FIG. 14, "Red: channel selection & ECG scenario; Green: ECG scenario of subsequent program; Yellow: ECG scenario of current program; Blue: ECG scenario of previous program" is displayed as the operation information. "Red", "Green", "Yellow" and "Blue" which are displayed as the operation information indicate selection buttons which are included in the remote control 190.

If the "Red" button is selected in this state, the execution and display of the channel selection menu is interrupted for channel selection and ECG scenario execution, and the video information of the selected program is displayed and the execution of the ECG scenario related to the selected program is started. If the "Green" button is selected, basic information is displayed in the basic information display frame 910 and an ECG scenario is displayed in the ECG scenario display frame 912 concerning the program which is scheduled to be provided in the time period that is later than the selected currently viewable program (which is also referred to hereinafter as the subsequent program). Further, if the "Green" button is selected repeatedly, basic information and an ECG scenario concerning the second program, the third program, . . . the n-th program after the currently viewable program may be displayed. Furthermore, if the "Green" button is selected (pressed) for a predetermined period of time, basic information and an ECG scenario concerning the program after 24 hours, the program after 48 hours and so on may be displayed. In the case where the "Yellow" button and the "Blue" button are selected, basic information and an ECG scenario concerning the selected program and the program which has been provided in the time period that is earlier than the selected program (which is also referred to hereinafter as the previous program), respectively, are displayed just like the case where the "Green" button is selected.

The basic information and the ECG scenario which are displayed in the display frames 910 and 912 may be switched appropriately according to the selection of operation information. Specifically, when the Red, Green, Yellow or Blue button is selected, designation information which designates the selected program is transmitted to the ECG server 200, and then the basic information and the ECG scenario which correspond to the designated program are transmitted to the receiving terminal 100 and displayed. If a provision period is set to each ECG data, the ECG data to which the provision period corresponding to the provision date and time of the ECG scenario is set is selected and displayed during the display of the ECG scenario.

Related information (ECG scenario) has a structure that allows display (provision) of different ECG data according to the provision date and time of an ECG scenario as shown in FIG. 16, for example. In the example of FIG. 16, different ECG data is displayed (provided) in each of the period (1) where the provision date and time of the ECG scenario is before the provision date and time of the program A2, the period (2) of the provision date and time (viewable period), and the period (3) after the provision date and time. The structure of the ECG scenario which is shown in FIG. 16 corresponds to the metadata of the ECG scenario and the ECG set shown in FIGS. 9A to 9C.

For example, as for the ECG set 1, program information 3 (the item ID "c11" shown in FIG. 9B or 9C), program information 1 (the item ID "c12") and program information 4 (the item ID "c13") are displayed as program information in the period (1) where the provision date and time of the ECG scenario is before the provision date and time of the program A2 (22:00 to 23:00), the period (2) of the provision date and time, and the period (3) after the provision date and time, respectively. Likewise, as for the ECG set 2, program information 2 (the item ID "c21"), program information 2 (the item ID "c21") and program information 5 (the item ID "c22") are displayed as program information in the same manner. The ECG sets 1 and 2 display sales information 1 (the item ID "c14") and sales information 2 (the item ID "c23") regardless of the provision date and time of the ECG scenario.

In the period (1) which is before the provision date and time of the program A2, the program information 3 that introduces the program scheduled to be provided and the program information 2 regarding the performer A of the program are displayed, for example, by the execution of the ECG scenario. It is thereby possible to prompt a user to view the program which is scheduled to be provided. The program information 2 corresponds to the ECG data whose provision period is set to the period before the provision date and time of the program A2 in the ECG data "program introduction A" which constitutes the ECG set 70 shown in FIG. 7, for example.

In the period (2) which is the provision date and time of the program A2, the program information 1 regarding the feature A of the program and the program information 2 regarding the performer A of the program are displayed, for example, by the execution of the ECG scenario. It is thereby possible to prompt a user to view the program which is currently provided. The program information 1 corresponds to the ECG data whose provision period is set to the period of the provision date and time of the program A2 in the ECG data "feature A" which constitutes the ECG set 80 shown in FIG. 7, for example.

In the period (3) which is after the provision date and time of the program A2, the program information 4 regarding the synopses of the provided program and the program information 5 that introduces the program scheduled to be provided next time are displayed, for example, by the execution of the ECG scenario. It is thereby possible to prompt a user to view the program which is scheduled to be provided next time. The program information 4 corresponds to the ECG data whose provision period is set to the period after the provision date and time of the program A2 in the ECG data "synopses A" which constitutes the ECG set 90 shown in FIG. 7, for example. The program information 5 corresponds to the ECG data whose provision period is set to the period after the provision date and time of the program A2 in the ECG data "program introduction A" which constitutes the ECG set 70 shown in FIG. 7, for example.

Related information (ECG scenario) is displayed together with different operation information according to the provision date and time of the ECG scenario and the function of the receiving terminal 100 as shown n FIG. 17, for example. As described later, the operation information is generated in a fixed format regardless of the content provider 300 that provides a program by the receiving terminal 100 or the ECG server 200 based on the function information which specifies the function of the receiving terminal 100.

In the example of FIG. 17, the program information 3 and 2 are displayed together with the operation information "recording reservation" and "return" at the time point before the provision date and time of the program A2 ("subsequent program"). The operation information "recording reservation" is displayed only when the receiving terminal 100 has recording function. A user can make recording reservation of the program A2 by selecting the operation information "recording reservation". At the time point of the provision date and time of the program A2 ("current program"), the program information 1 and 2 are displayed together with the operation information "return". At the time point after the provision date and time of the program A2 ("previous program"), the program information 4 and 5 are displayed together with the operation information "recording reservation" and "return". A user can make recording reservation of a program regarding the program A2 which is scheduled to be provided next time (e.g. in the case of program in series) by selecting the operation information "recording reservation". The operation information "return" is used to return to the display of the previous operation screen.

As for service provision information, the sales information 1 and 2 are displayed together with the operation information "purchase" and "return" regardless of the provision date and time of the ECG scenario. The operation information "purchase" is displayed only when the receiving terminal 100 has payment function. If the receiving terminal 100 does not have payment function, the operation information "temporary saving" for temporarily saving the relevant sales information may be displayed. A user can thereby perform purchase processing of the relevant product smoothly.

FIG. 18 shows an example of operation information which is displayed together with an ECG scenario. Referring to FIG. 18, as for program information, "recording reservation" or the like is displayed as operation information at the time of browsing program information at the time point before the provision date and time of a program ("subsequent program"). Alternatively, "viewing reservation" for performing viewing reservation may be displayed as operation information. Further, in the case of a pay program, "viewing reservation" or the like is displayed as operation information at the time of purchasing the program. At the time point of the provision date and time of a program ("current program"), in the case of a pay program, "viewing" or the like is displayed as operation information at the time of purchasing the program. At the time point after the provision date and time of a program ("previous program"), "recording reservation" or the like is displayed as operation information at the time of browsing program information. Further, "viewing reservation" for making viewing reservation of a program regarding the relevant program which is scheduled to be provided next time or "recorded program playback" for performing playback when a program is recorded may be displayed as operation information. In the case of a pay program, "viewing" or the like is displayed as operation information at the time of purchasing the program.

As for service provision information, "purchase", "temporary saving" and so on are displayed as operation information at the time of browsing sales information in the period between before and after the provision date and time of a program. At the time of browsing advertising information, "browsing verification" or the like is displayed as operation information in order to verify that the advertising information is browsed for the purpose of questionnaire about advertisement browsing or the like.

As described in the foregoing, according to the information providing system of this embodiment, the ECG server 200 stores an ECG scenario which is composed of a plurality of pieces of ECG data to which each provision period is settable in association with a program. The receiving terminal 100 transmits designation information which designates a program to the ECG server 200, and the ECG server 200 receives the designation information and extracts an ECG scenario which corresponds to the designated program. The ECG server 200 transmits the extracted ECG scenario to the receiving terminal 100, and the receiving terminal 100 receives the transmitted ECG scenario. Then, the receiving terminal 100 or the ECG server 200 selects the ECG data to which a provision period corresponding to the provision time point of the ECG scenario is set from a plurality of pieces of ECG data that constitute the received or extracted ECG scenario as ECG data which constitutes the ECG scenario. The ECG data to which a provision period corresponding to the provision time point of the ECG scenario is set is thereby selected, so that a timely appropriate ECG scenario is provided.

The receiving terminal 100 or the ECG server 200 generates operation information which is appropriate for the function information that specifies the function of the receiving terminal 100 and the temporal relationship between the provision time of a program and the provision time point of an ECG scenario for the operation regarding an ECG scenario. The operation information which is appropriate for the function of the receiving terminal 100 and the temporal relationship between the scheduled time of a program and the provision time point of an ECG scenario is thereby generated in a fixed format, so that timely appropriate operation information which is correspond to the function of the receiving terminal 100 is provided.

It should be understood by those skilled in the art that various modifications, combinations, sub-combinations and alterations may occur depending on design requirements and other factors insofar as they are within the scope of the appended claims or the equivalents thereof.

In the above-described embodiment, the case where the provision period of ECG data is set to the provision period (viewable period) of a program and the period adjacent before and after the provision period is described. However, the provision period of ECG data may be set to the period which is different form the period adjacent before and after the program provision period. It is thereby possible to provide more timely appropriate information by changing the content of information which introduces a program according to a difference in period between the provision period of a program and the provision period of ECG data, for example.

Further, the priorities when displaying ECG data may be changed so as to correspond to the setting of the provision period of ECG data. It is thereby possible to provide more timely appropriate information by preferentially displaying information which introduces a program in the period before the provision period of a program according to the provision period of ECG data, for example.

In the above-described embodiment, the case of selecting a program and displaying an ECG scenario regarding the selected program on a channel selection menu is described. However, the present invention is not limited thereto, and selection or display may be made while viewing a program rather than making selection or display on a channel selection menu.

What is claimed is:

1. An information providing system, comprising:
an information receiving terminal that receives programming and includes:
a network interface that connects to a communication network, a designation information transmitting portion to transmit designation information designating a program, and a related information receiving portion to receive related information appropriate for the designated program; and an information providing apparatus that provides the related information associated with the programming and includes:

a network interface that connects to the communication network, a related information storage portion to store the related information including a plurality of different pieces of information associated with the designated program, wherein the plurality of different pieces of information include settable provision periods that designate time periods before, during, and after a scheduled time of the designated program, in which respective different pieces of information are associated with the designated program, a designation information receiving portion to receive the designation information from the information receiving terminal, a related information extracting portion to extract the related information appropriate for the designated program from the related information storage portion, and a related information transmitting portion to transmit the extracted related information to the information receiving terminal, wherein at least one of the information receiving terminal and the information providing apparatus includes an information selecting portion to select one of the pieces of information associated with the designated program and included in the related information that has the set provision periods each corresponding to a time point when the selection is made, and the related information extracting portion extracts the selected piece of information as the extracted related information when the information selecting portion is included in the information providing apparatus.

2. The information providing system according to claim 1, wherein a first time period corresponds to one of the time periods before the scheduled time of the designated program, the first time period including a start date and time and an end date and time in which a first piece of information of the respective different pieces of information is associated with the designated program, a second time period corresponds to one of the time periods during the scheduled time of the designated program, the second time period including a start date and time and an end date and time in which a second piece of information of the respective different pieces of information is associated with the designated program, and a third time period corresponds to one of the time periods after the scheduled time of the designated program, the third time period including a start date and time and an end date and time in which a third piece of information of the respective different pieces of information is associated with the designated program.

3. An information receiving terminal that receives programming, comprising:

a network interface that connects to an information providing apparatus through a communication network, the information providing apparatus being configured to provide related information associated with the programming;

a designation information transmitting portion to transmit designation information designating a program to the information providing apparatus;

a related information receiving portion to receive the related information from the information providing apparatus, the related information including a plurality of different pieces of information associated with the designated program, wherein the plurality of different pieces of information include settable provision periods that designate time periods before, during, and after a scheduled time of the designated program, in which respective different pieces of information are associated with the designated program; and an information selecting portion to select one of the pieces of information associated with the designated program and included in the related information that has the set provision periods each corresponding to a time point when the selection is made.

4. The information receiving terminal according to claim 3, further comprising:

a display/playback portion to display/playback the received related information, wherein the related information is composed of one or more scenario information in a scenario form so as to sequentially display/playback a plurality of pieces of information.

5. An information providing apparatus for providing related information associated with programming, comprising:

a network interface that connects to an information receiving terminal through a communication network, the network receiving terminal being configured to receive the programming;

a related information storage portion to store the related information including a plurality of different pieces of information associated with a designated program, wherein the plurality of different pieces of information include settable provision periods that designate time periods before, during, and after a scheduled time of the designated program, in which respective different pieces of information are associated with the designated program;

a designation information receiving portion to receive designation information designating the designated program from the information receiving terminal;

a related information extracting portion to extract the related information appropriate for the designated program from the related information storage portion;

an information selecting portion to select one of the pieces of information associated with the designated program and included in the related information that has the set provision periods each corresponding to a time point when the selection is made as selected related information; and a related information transmitting portion to transmit the selected related information to the information receiving terminal.

6. The information providing apparatus according to claim 5, wherein the related information is composed of one or more scenario information in a scenario form so as to sequentially display/playback a plurality of pieces of information by the information receiving terminal.

7. An information providing method, comprising:
  storing, in an information providing apparatus, related information associated with programming received by an information receiving terminal and including a plurality of different pieces of information associated with a designated program, wherein the plurality of different pieces of information include settable provision periods that designate time periods before, during, and after a scheduled time of the designated program, in which respective different pieces of information are associated with the designated program;
  extracting the related information appropriate for the designated program that is designated by the information receiving terminal;
  transmitting the extracted related information to the information receiving terminal from the information providing apparatus; and
  selecting one of the pieces of information associated with the designated program and included in the related information that has the set provision periods each corresponding to a time point when the selection is made.

8. A non-transitory computer readable medium encoded thereon with a program that when executed by a processor of an information receiving terminal that receives programming, causes the information receiving terminal to perform a method comprising:
  transmitting designation information designating a program to an information providing apparatus that provides related information associated with the designated program and connects to the information receiving terminal via a communication network;
  receiving the related information from the information providing apparatus, the related information including a plurality of different pieces of information associated with the designated program, wherein the plurality of different pieces of information include settable provision periods that designate time periods before, during, and after a scheduled time of the designated program, in which respective different pieces of information are associated with the designated program; and
  selecting one of the pieces of information associated with the designated program and included in the related information that has the set provision periods each corresponding to a time point when the selection is made.

9. A non-transitory computer readable medium encoded thereon with a program that when executed by a processor of an information providing apparatus that provides related information associated with programming, causes the information providing apparatus to perform a method comprising:
  storing, in a related information storage unit, the related information including a plurality of different pieces of information associated with a designated program, wherein the plurality of different pieces of information include settable provision periods that designate time periods before, during, and after a scheduled time of the designated program, in which respective different pieces of information are associated with the designated program;
  receiving designation information designating the designated program from an information receiving terminal that receives the programming and connects to the information providing apparatus via a communication network;
  extracting the related information appropriate for the designated program from the related information storage unit;
  selecting one of the pieces of information associated with the designated program and included in the related information that has the set provision periods each corresponding to a time point when the selection is made; and
  transmitting the selected related information to the information receiving terminal.

10. An information providing system, comprising:
  an information receiving terminal that receives programming and includes:
    a network interface that connects to a communication network,
    a designation information transmitting portion to transmit designation information designating a program, and
    a related information receiving portion to receive related information appropriate for the designated program; and
  an information providing apparatus that provides the related information associated with the programming and includes:
    a network interface that connects to the communication network,
    a related information storage portion to store the related information including a plurality of different pieces of information associated with the designated program, wherein the plurality of different pieces of information include settable provision periods that designate time periods before, during, and after a scheduled time of the designated program, in which respective different pieces of information are associated with the designated program,
    a designation information receiving portion to receive the designation information from the information receiving terminal,
    a related information extracting portion to extract the related information appropriate for the designated program from the related information storage portion, and
    a related information transmitting portion to transmit the extracted related information to the information receiving terminal, wherein
  at least one of the information receiving terminal and the information providing apparatus includes:
    an information selecting portion to select one of the pieces of information associated with the designated program and included in the related information that has the set provision periods each corresponding to a time point when the selection is made, and
    an operation information generating portion to generate operation information appropriate for function information specifying a function of the information receiving terminal and a temporal relationship between the scheduled time of the designated program and the time point of the related information for operation regarding the related information, and
  the related information extracting portion extracts the selected piece of information as the extracted related information when the information selecting portion is included in the information providing apparatus.

11. An information receiving terminal that receives programming, comprising:
  a network interface that connects to an information providing apparatus through a communication network, the information providing apparatus being configured to provide related information associated with the programming;

a designation information transmitting portion to transmit designation information designating a program to the information providing apparatus;

a related information receiving portion to receive the related information from the information providing apparatus, the related information including a plurality of different pieces of information associated with the designated program, wherein the plurality of different pieces of information include settable provision periods that designate time periods before, during, and after a scheduled time of the designated program, in which respective different pieces of information are associated with the designated program;

an information selecting portion to select one of the pieces of information associated with the designated program and included in the related information that has the set provision periods each corresponding to a time point when the selection is made; and an operation information generating portion to generate operation information appropriate for function information specifying its own function and a temporal relationship between the scheduled time of the designated program and the time point of the related information for operation regarding the related information.

12. An information providing apparatus for providing related information associated with programming, comprising:

a network interface that connects to an information receiving terminal through a communication network, the information receiving terminal being configured to receive the programming;

a related information storage portion to store the related information including a plurality of different pieces of information associated with a designated program, wherein the plurality of different pieces of information include settable provision periods that designate time periods before, during, and after a scheduled time of the designated program, in which respective different pieces of information are associated with the designated program;

a designation information receiving portion to receive designation information designating the designated program from the information receiving terminal;

a related information extracting portion to extract the related information appropriate for the designated program from the related information storage portion;

an information selecting portion to select one of the pieces of information associated with the designated program and included in the related information that has the set provision periods each corresponding to a time point when the selection is made as selected related information;

a related information transmitting portion to transmit the selected related information to the information receiving terminal;

a function information receiving portion to receive function information specifying a function of the information receiving terminal from the information receiving terminal;

an operation information generating portion to generate operation information appropriate for the received function information and a temporal relationship between the scheduled time of the designated program and the time point of the related information for operation regarding the related information; and an operation information transmitting portion to transmit the generated operation information to the information receiving terminal.

13. An information providing method, comprising:

storing, in an information providing apparatus, related information associated with programming received by an information receiving terminal and including a plurality of different pieces of information associated with a designated program, wherein the plurality of different pieces of information include settable provision periods that designate time periods before, during, and after a scheduled time of the designated program, in which respective different pieces of information are associated with the designated program;

extracting the related information appropriate for the designated program that is designated by the information receiving terminal;

transmitting the extracted related information to the information receiving terminal from the information providing apparatus;

selecting one of the pieces of information associated with the designated program and included in the related information that has the set provision periods each corresponding to a time point when the selection is made; and generating operation information appropriate for function information specifying a function of the information receiving terminal and a temporal relationship between the scheduled time of the designated program and the time point of the related information for operation regarding the related information in the information receiving terminal or the information providing apparatus.

14. A non-transitory computer readable medium encoded thereon with a program that when executed by a processor of an information receiving terminal that receives programming, causes the information receiving terminal to perform a method comprising:

transmitting designation information designating a program to an information providing apparatus that provides related information associated with the designated program and connects to the information receiving terminal via a communication network;

receiving the related information form the information providing apparatus, the related information including a plurality of different pieces of information associated with the designated program, wherein the plurality of different pieces of information include settable provision periods that designate time periods before, during, and after a scheduled time of the designated program, in which respective different pieces of information are associated with the designated program; and selecting one of the pieces of information associated with the designated program and included in the related information that has the set provision periods each corresponding to a time point when the selection is made; and generating operation information appropriate for function information specifying its own function and a temporal relationship between the scheduled time of the designated program and the time point of the related information for operation regarding the related information.

15. A non-transitory computer readable medium encoded thereon with a program that when executed by a processor of an information providing apparatus that provides related information associated with programming, causes the information providing apparatus to perform a method comprising:

storing, in a related information storage unit, the related information including a plurality of different pieces of information associated with a designated program, wherein the plurality of different pieces of information include settable provision periods that designate time periods before, during, and after a scheduled time of the designated program, in which respective different pieces of information are associated with the designated program;

receiving designation information designating the designated program from an information receiving terminal that receives the programming and connects to the information providing apparatus via a communication network;

extracting the related information appropriate for the designated program from the related information storage unit;

selecting one of the pieces of information associated with the designated program and included in the related information that has the set provision periods each corresponding to a time point when the selection is made;

transmitting the selected related information to the information receiving terminal;

receiving function information specifying a function of the information receiving terminal from the information receiving terminal;

generating operation information appropriate for the received function information and a temporal relationship between the scheduled time of the designated program and the time point of the related information for operation regarding the related information; and transmitting the generated operation information to the information receiving terminal.

* * * * *